(12) United States Patent
Falzone et al.

(10) Patent No.: US 10,269,000 B2
(45) Date of Patent: Apr. 23, 2019

(54) POINT OF SALE SYSTEM

(71) Applicant: REVEL SYSTEMS, INC., San Francisco, CA (US)

(72) Inventors: Lisa Falzone, San Francisco, CA (US); Christopher Ciabarra, Sausalito, CA (US)

(73) Assignee: Revel Systems, Inc., San Francisco, CA (US)

( * ) Notice: Subject to any disclaimer, the term of this patent is extended or adjusted under 35 U.S.C. 154(b) by 511 days.

(21) Appl. No.: 15/043,163

(22) Filed: Feb. 12, 2016

(65) Prior Publication Data

US 2016/0162864 A1  Jun. 9, 2016

Related U.S. Application Data

(63) Continuation of application No. 13/227,397, filed on Sep. 7, 2011, now abandoned.

(60) Provisional application No. 61/380,674, filed on Sep. 7, 2010.

(51) Int. Cl.

| G06Q 20/20 | (2012.01) |
| G07F 7/08 | (2006.01) |
| G07G 1/00 | (2006.01) |
| G07F 1/00 | (2006.01) |

(52) U.S. Cl.
CPC .......... *G06Q 20/202* (2013.01); *G06Q 20/20* (2013.01); *G07F 7/08* (2013.01); *G07G 1/0009* (2013.01); *G07G 1/0018* (2013.01)

(58) Field of Classification Search
USPC .......................................................... 705/16
See application file for complete search history.

(56) References Cited

U.S. PATENT DOCUMENTS

| 5,579,487 | A | * | 11/1996 | Meyerson | G06F 1/1626 361/679.41 |
| 5,719,918 | A | * | 2/1998 | Serbetciouglu | G06Q 20/04 379/93.12 |
| 5,878,211 | A | * | 3/1999 | Delagrange | G06F 1/1632 726/34 |
| 5,933,812 | A | * | 8/1999 | Meyer | G06Q 20/20 235/380 |
| 6,018,770 | A | * | 1/2000 | Little | H04L 12/6418 709/223 |
| 6,065,679 | A | * | 5/2000 | Levie | G06Q 20/343 235/462.47 |
| 6,070,199 | A | * | 5/2000 | Axtman | H04L 29/06 361/679.4 |
| 6,078,789 | A | * | 6/2000 | Bodenmann | G06F 3/038 370/470 |
| 6,311,165 | B1 | * | 10/2001 | Coutts | G06Q 20/1085 235/379 |
| 6,373,511 | B1 | * | 4/2002 | Groves | B41J 3/36 347/198 |
| 6,546,425 | B1 | * | 4/2003 | Hanson | H04L 1/188 709/227 |
| 6,714,969 | B1 | * | 3/2004 | Klein | G06F 1/1616 709/219 |
| 6,806,866 | B2 | * | 10/2004 | Benayoun | G06F 3/038 345/156 |

(Continued)

*Primary Examiner* — Ashford S Hayles
(74) *Attorney, Agent, or Firm* — Wiley Rein LLP

(57) ABSTRACT

Aspects of the current patent document include systems, methods, and computer program products for facilitating point of sale transactions and payment transactions.

15 Claims, 14 Drawing Sheets

(56) References Cited

U.S. PATENT DOCUMENTS

| | | | | |
|---|---|---|---|---|
| 6,901,381 B2* | 5/2005 | Brown | G06Q 10/087 | 235/385 |
| 6,944,689 B2* | 9/2005 | Billington | G06F 1/16 | 347/198 |
| 6,965,614 B1* | 11/2005 | Osterhout | H04L 12/12 | 370/466 |
| 6,970,850 B1* | 11/2005 | Freeny, Jr. | G06Q 20/04 | 700/241 |
| 7,073,717 B1* | 7/2006 | Arnold | B65C 11/0284 | 235/432 |
| 7,310,498 B2* | 12/2007 | Henry | H04W 36/06 | 455/41.1 |
| 7,353,208 B1* | 4/2008 | Stambaugh | G06Q 20/04 | 380/247 |
| 7,386,471 B1* | 6/2008 | Nack | G06Q 20/20 | 705/16 |
| 7,827,063 B2* | 11/2010 | Girdler | G06Q 20/20 | 361/676 |
| 7,837,104 B2* | 11/2010 | Lum | F16M 11/10 | 235/379 |
| 7,841,524 B2* | 11/2010 | Schmidt | A47F 9/04 | 177/25.15 |
| D636,778 S * | 4/2011 | Corsini | D13/107 | |
| 8,020,761 B2* | 9/2011 | Lum | G07G 1/0018 | 235/379 |
| 8,235,289 B2* | 8/2012 | Hsu | G06Q 20/20 | 235/383 |
| 8,250,187 B2* | 8/2012 | Cacheria, III | G06Q 10/1057 | 709/221 |
| 8,363,247 B2* | 1/2013 | Butcher | G06F 3/1205 | 358/1.13 |
| 8,364,547 B2* | 1/2013 | Metzger | G06Q 10/087 | 705/26.1 |
| 8,407,097 B2* | 3/2013 | Sperduti | G06Q 20/20 | 705/22 |
| 8,542,834 B1* | 9/2013 | Feikis | H04L 63/18 | 380/270 |
| 8,694,435 B1* | 4/2014 | Bishop | G06Q 20/202 | 705/21 |
| 8,966,610 B2* | 2/2015 | Coppinger | G06Q 20/20 | 709/238 |
| 9,569,763 B2* | 2/2017 | Clifford | G06Q 20/20 | |
| 2001/0016871 A1* | 8/2001 | Fujita | G06Q 20/20 | 709/203 |
| 2002/0025796 A1* | 2/2002 | Taylor | G06Q 20/20 | 455/406 |
| 2002/0042753 A1* | 4/2002 | Ortiz | G06Q 20/20 | 705/26.44 |
| 2002/0042774 A1* | 4/2002 | Ortiz | G06Q 20/06 | 705/39 |
| 2002/0052965 A1* | 5/2002 | Dowling | H04W 36/22 | 709/230 |
| 2002/0077974 A1* | 6/2002 | Ortiz | G06Q 20/10 | 705/39 |
| 2002/0080967 A1* | 6/2002 | Abdo | G06F 21/85 | 380/270 |
| 2002/0159406 A1* | 10/2002 | Fukuda | H04L 29/06 | 370/328 |
| 2002/0190128 A1* | 12/2002 | Levine | G06K 17/0022 | 235/462.13 |
| 2003/0033452 A1* | 2/2003 | Himmel | H04W 74/06 | 710/9 |
| 2003/0128675 A1* | 7/2003 | Kuo | H04L 27/04 | 370/328 |
| 2003/0135418 A1* | 7/2003 | Shekhar | G06Q 20/20 | 705/16 |
| 2004/0029569 A1* | 2/2004 | Khan | G06Q 20/02 | 455/414.1 |
| 2004/0054623 A1* | 3/2004 | Collins | G06K 19/06028 | 705/39 |
| 2004/0122738 A1* | 6/2004 | Lum | G06Q 20/202 | 705/21 |
| 2004/0159699 A1* | 8/2004 | Nelson | G06Q 20/20 | 235/379 |
| 2004/0181461 A1* | 9/2004 | Raiyani | G06Q 30/02 | 705/14.64 |
| 2004/0186781 A1* | 9/2004 | Swain | G06Q 20/04 | 705/15 |
| 2005/0006468 A1* | 1/2005 | Fandel | G06Q 20/20 | 235/383 |
| 2005/0035198 A1* | 2/2005 | Wilensky | B62B 3/1424 | 235/383 |
| 2005/0197935 A1* | 9/2005 | Tseng | G06Q 40/00 | 705/35 |
| 2006/0020497 A1* | 1/2006 | McNally | G06Q 10/02 | 705/5 |
| 2006/0049255 A1* | 3/2006 | von Mueller | G06F 21/72 | 235/449 |
| 2006/0085265 A1* | 4/2006 | Dietz | G06Q 30/02 | 705/15 |
| 2006/0111983 A1* | 5/2006 | Malison | G06Q 20/04 | 705/26.1 |
| 2006/0171413 A1* | 8/2006 | Kim | H04L 69/08 | 370/466 |
| 2006/0221386 A1* | 10/2006 | Brooks | G06F 8/60 | 358/1.15 |
| 2006/0255128 A1* | 11/2006 | Johnson | G06Q 20/12 | 235/380 |
| 2007/0006181 A1* | 1/2007 | Zimman | H04L 7/044 | 717/136 |
| 2007/0038727 A1* | 2/2007 | Bailey | G06Q 10/02 | 709/219 |
| 2007/0185991 A1* | 8/2007 | Ofir | G06Q 20/04 | 709/224 |
| 2007/0194105 A1* | 8/2007 | Kissick | G06Q 20/0453 | 235/379 |
| 2007/0205275 A1* | 9/2007 | Nicola | G06Q 20/20 | 235/383 |
| 2007/0248393 A1* | 10/2007 | Shuldman | G06F 3/1209 | 400/62 |
| 2007/0276763 A1* | 11/2007 | Kleinman | G06Q 20/382 | 705/64 |
| 2008/0011850 A1* | 1/2008 | Henry | G06K 7/0004 | 235/441 |
| 2008/0105743 A1* | 5/2008 | Mills | G06K 7/10 | 235/441 |
| 2008/0247348 A1* | 10/2008 | Wilson | H04L 67/1027 | 370/313 |
| 2008/0279561 A1* | 11/2008 | Sakai | H04W 4/18 | 398/130 |
| 2009/0036067 A1* | 2/2009 | Rofougaran | G06F 13/4068 | 455/91 |
| 2009/0037286 A1* | 2/2009 | Foster | G06Q 20/20 | 705/21 |
| 2009/0063312 A1* | 3/2009 | Hurst | G06Q 20/105 | 705/30 |
| 2009/0145958 A1* | 6/2009 | Stoutenburg | G06Q 20/04 | 235/376 |
| 2009/0216676 A1* | 8/2009 | Mathur | G06Q 20/32 | 705/44 |
| 2009/0228836 A1* | 9/2009 | Silva | G06Q 30/0603 | 715/841 |
| 2010/0046436 A1* | 2/2010 | Doviak | H04L 12/5692 | 370/328 |
| 2010/0097435 A1* | 4/2010 | Henry | B41J 3/36 | 347/171 |
| 2010/0146155 A1* | 6/2010 | Brock | G06F 9/4411 | 710/11 |
| 2010/0167782 A1* | 7/2010 | Mahany | G06F 1/163 | 455/553.1 |
| 2010/0177660 A1* | 7/2010 | Essinger | H04W 4/50 | 370/254 |
| 2011/0022482 A1* | 1/2011 | Florek | G06Q 20/20 | 705/16 |
| 2011/0071949 A1* | 3/2011 | Petrov | G06Q 20/10 | 705/72 |
| 2011/0172960 A1* | 7/2011 | St.George | G07G 1/14 | 702/179 |

(56) References Cited

U.S. PATENT DOCUMENTS

| | | | |
|---|---|---|---|
| 2011/0231266 A1* | 9/2011 | Baril | G06Q 20/204 705/15 |
| 2011/0231272 A1* | 9/2011 | Englund | G06Q 20/20 705/21 |
| 2011/0313871 A1* | 12/2011 | Greenwood | G06Q 20/10 705/16 |
| 2012/0016754 A1* | 1/2012 | Jackson | G06Q 10/0631 705/15 |
| 2012/0016758 A1* | 1/2012 | Bouaziz | G06Q 20/20 705/17 |
| 2012/0066079 A1* | 3/2012 | Falzone | G06Q 20/20 705/16 |
| 2014/0207670 A1* | 7/2014 | Matotek | G06Q 20/20 705/41 |
| 2014/0289133 A1* | 9/2014 | Weston | G06F 21/554 705/72 |

\* cited by examiner

Packet-Level
Datastream
↗
350

```
+----------+--------+
06:46:07,737,350  ETHER
|0
|00|00|48|6c|0e|df|00|1f|3b|51|62|c9|08|00|45|00|00|30|5c|68|40|00|80|06|8
7|87|0a|00|01|0c|0a|00|01|cd|c1|c7|23|8c|dd|7a|aa|07|00|00|00|00|70|02|20
|00|df|70|00|00|02|04|05|b4|01|01|04|02|
+----------+--------+
06:46:07,740,790  ETHER
|0
|00|1f|3b|51|62|c9|00|00|48|6c|0e|df|08|00|45|00|00|2c|00|00|00|00|ff|06|a4|
f3|0a|00|01|cd|0a|00|01|0c|23|8c|c1|c7|0a|80|43|83|dd|7a|aa|08|60|12|20|
0|a6|63|00|00|02|04|05|b4|00|00|
+----------+--------+
06:46:07,740,856  ETHER
|0
|00|00|48|6c|0e|df|00|1f|3b|51|62|c9|08|00|45|00|00|28|5c|69|40|00|80|06|8
7|8e|0a|00|01|0c|0a|00|01|cd|c1|c7|23|8c|dd|7a|aa|08|0a|80|43|84|50|10|44
|70|99|b0|00|00|
+----------+--------+
06:46:33,297,104  ETHER
|0
|00|00|48|6c|0e|df|00|1f|3b|51|62|c9|08|00|45|00|00|28|5c|6c|40|00|80|06|8
7|8b|0a|00|01|0c|0a|00|01|cd|c1|c7|23|8c|dd|7a|aa|08|0a|80|43|84|50|14|00
|00|de|1c|00|00|
+----------+--------+
```

*FIG. 3B*

```
char pkt11[] = {
0x00, 0x00, 0x48, 0x6c, 0x0e, 0xdf, 0x00, 0x1f,
0x3b, 0x51, 0x62, 0xc9, 0x08, 0x00, 0x45, 0x00,
0x00, 0x00, 0x5c, 0x68, 0x40, 0x00, 0x80, 0x06,
0x00, 0x87, 0x08, 0x00, 0x01, 0x0c, 0x08, 0x00,
0x01, 0xcd, 0xc1, 0xc7, 0x23, 0x8c, 0xdd, 0x7a,
0xaa, 0x07, 0x00, 0x00, 0x00, 0x00, 0x70, 0x02,
0x20, 0x00, 0xdf, 0x70, 0x00, 0x00, 0x02, 0x04,
0x05, 0xb4, 0x01, 0x01, 0x04, 0x02 };

char pkt12[] = {
0x00, 0x1f, 0x3b, 0x51, 0x62, 0xc9, 0x00, 0x00,
0x48, 0x6c, 0x0e, 0xdf, 0x08, 0x00, 0x45, 0x00,
0x00, 0x2c, 0x00, 0x00, 0x00, 0x00, 0xff, 0x06,
0xa4, 0xf3, 0x08, 0x0a, 0x01, 0x0c, 0x0a, 0x00,
0x01, 0x0c, 0x23, 0x8c, 0xc1, 0xc7, 0x0a, 0x80,
0x43, 0x83, 0xdd, 0x7a, 0xaa, 0x08, 0x60, 0x12,
0x20, 0x04, 0x00, 0x63, 0x00, 0x00, 0x02, 0x04,
0x05, 0xb4, 0x00, 0x00 };

char pkt13[] = {
0x00, 0x00, 0x48, 0x6c, 0x0e, 0xdf, 0x00, 0x1f,
0x3b, 0x51, 0x62, 0xc9, 0x08, 0x00, 0x45, 0x00,
0x00, 0x28, 0x5c, 0x69, 0x40, 0x00, 0x80, 0x06,
0x87, 0x8e, 0x0a, 0x00, 0x01, 0x0c, 0x08, 0x00,
0x01, 0xcd, 0xc1, 0xc7, 0x23, 0x8c, 0xdd, 0x7a,
0xaa, 0x08, 0x08, 0x0a, 0x84, 0x50, 0x84, 0x10,
0x44, 0x70, 0x99, 0x60, 0x00, 0x00 };

char pkt14[] = {
0x00, 0x00, 0x48, 0x6c, 0x0e, 0xdf, 0x00, 0x1f,
0x3b, 0x51, 0x62, 0xc9, 0x08, 0x00, 0x45, 0x00,
0x00, 0x28, 0x5c, 0x6c, 0x40, 0x00, 0x80, 0x06,
0x87, 0x8b, 0x0a, 0x00, 0x01, 0x0c, 0x0a, 0x00,
0x01, 0xcd, 0xc1, 0xc7, 0x23, 0x8c, 0xdd, 0x7a,
0xaa, 0x08, 0x08, 0x0a, 0x84, 0x43, 0x08, 0x50, 0x14,
0x00, 0x00, 0x1c, 0xde, 0x00, 0x00 };
```

Data Array Structure 354

FIG. 3C

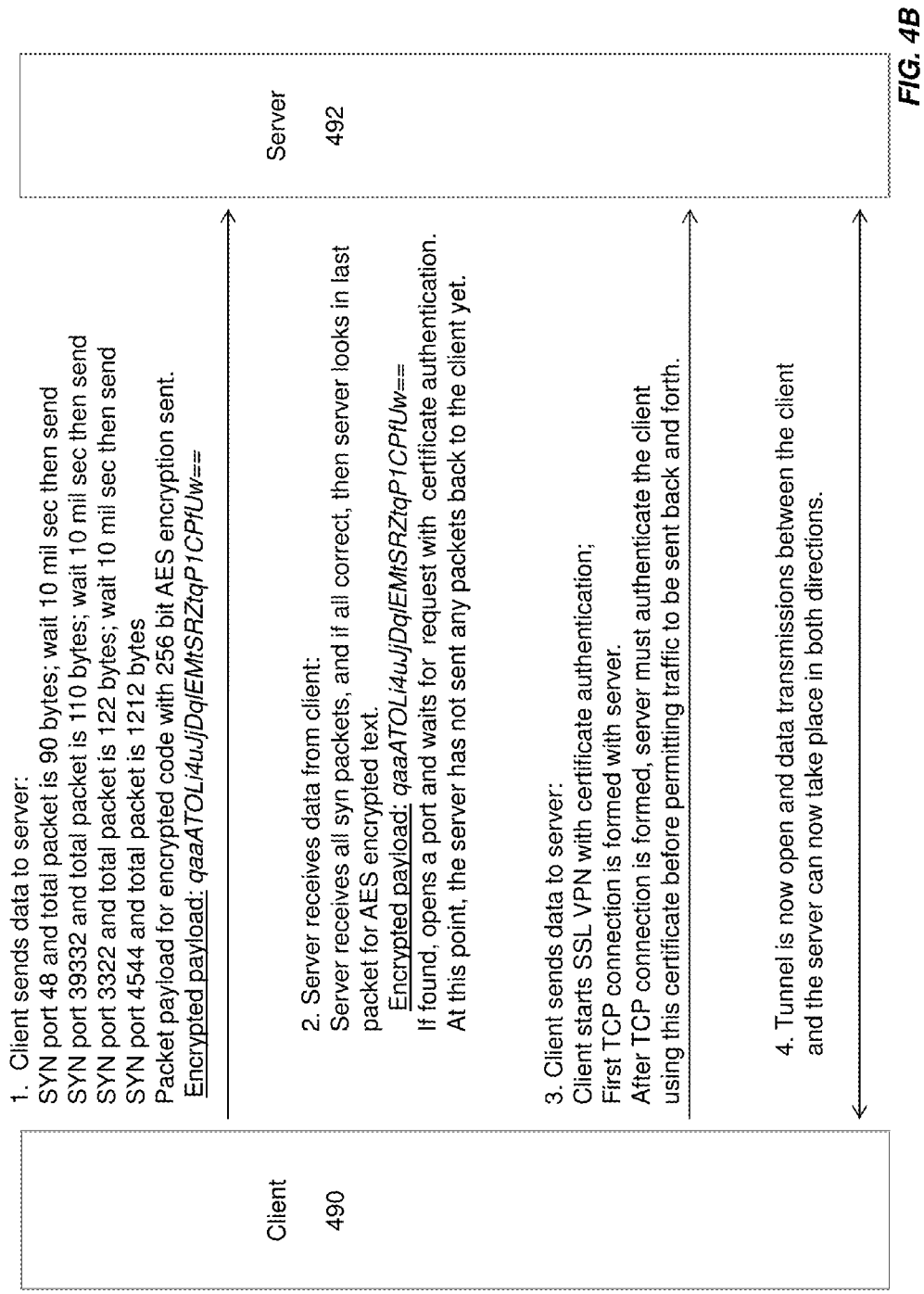

| No. | Command | Complete Command String in Hex ||||| 
|---|---|---|---|---|---|---|
| | | Header || Data | Ending Message | Checksum Character (if any) | Description |
| | | Major | Minor | | | | |
| | Notes for Dispense Commands: | | | | | | 'Busy Flag Bit' (Stat1 Bit 3) will be SET *during* dispense. 'Coin Dispensed Bit' (Stat1 Bit 5) will be SET *after* a successful dispense cycle. Remember to send the 'Reset Machine Status' command *before* each 'Dispense' command to CLEAR the 'Coin Dispensed Bit' (Stat1 Bit 5). |
| 1 | Dispense by Column | 04 | 50 | [Column 1]..[Column 8] | 02 | 03 | [cc] | [EOT] [P] [STX] [Column 1]...[Column 8] [ETX] [cc]. [Column 8] represents each column. Each column dispenses up to nine coins. Repeat the command for more column dispenses. To dispense one coin from Columns 1-4 send: 0x04 0x50 0x02 0x31 0x31 0x31 0x30 0x30 0x30 0x30 0x03 0x02 |
| 2 | Dispense by Denomination | 04 | 44 | [Data 1]..[Data n] | 02 | 03 | [cc] | [EOT] [D] [STX] [Data 1]...[Data n] [ETX] [cc]. Canister Entity coin types determine 'Data n'. For the USA canister, n = 4 (there are quarter, dime, nickel and penny coins). To dispense 37 cents send: 0x04 0x44 0x02 0x31 0x30 0x32 0x03 0x01 => [Data 1]...[Data n] = 1 Quarter, 1 Dime, 0 Nickels, 2 Pennies. |
| 3 | Dispense by Amount | 04 | 43 | [HexValue2][HexValue1] | 02 | 03 | [cc] | [EOT] [C] [STX] [HexValue2][HexValue1] [ETX] [cc]. Additional ASCII characters are allowed prior to [HexValue2][HexValue1]: '$',','.',' (0x24, 0x2E and 0x20). Include them in calculating the Checksum. To dispense 78 cents by amount send: 0x04 0x43 0x02 0x37 0x38 0x03 0x0C |
| 4 | Get Canister Status | 04 | 43* | 0A | | 05 | | [EOT] [C] [LF] [ENQ] |
| 5 | Reset Machine Status | 04 | 43* | 72 | | 05 | | [EOT] [C] [r] [ENQ]. Clears the Coin Dispensed Bit (Stat1 Bit 5). Send 'Reset Machine Status' before any dispense. To reset and dispense 78 cents by amount send: 0x04 0x43 0x72 0x05 and then 0x04 0x43 0x02 0x37 0x38 0x03 0x0C. Note the Header Major byte in each Command match (0x43). Once the type of dispense is determined this byte does not have to be modified by the user. |

FIG. 10

POINT OF SALE SYSTEM

CROSS-REFERENCE TO RELATED APPLICATIONS

This patent application claims priority to and is a continuation of and commonly-owned U.S. patent application Ser. No. 13/227,397, filed on Sep. 7, 2011, entitled "POINT OF SALE SYSTEM," listing Lisa Falzone and Christopher Ciabarra as inventors, and which claims priority to U.S. Prov. Pat. App. No. 61/380,674, filed on Sep. 7, 2010, entitled "POINT OF SALE SYSTEM," listing Lisa Falzone and Christopher Ciabarra as inventors. Each of the aforementioned applications is incorporated herein in its entirety by reference.

FIELD OF THE INVENTION

Embodiments of the present invention generally relate to systems and methods for facilitating point of sale transactions and payment transactions.

BACKGROUND OF THE INVENTION

Various solutions exist today for conducting point of sale transactions in retail locations, services establishments and other commercial environments. Some of these solutions rely on custom-built hardware technology that may be relatively expensive to purchase and maintain. Some of these solutions involve a relatively-low degree of technology integration or overreliance on human personnel activities, which may result in inefficient use of human resources and underutilization of technology potential.

Consequently, there is a significant need in the industry for improved point of sale technology and services that rely on more standardized hardware resources and can decrease capital investments while enhancing operational efficiencies.

BRIEF SUMMARY

Various example embodiments describe systems, methods, and computer program products for facilitating point of sale transactions and payment transactions.

One embodiment provides a point of sale (POS) electronic system for conducting a commercial transaction, which comprises a mobile data processing system configured to mediate a commercial transaction. The mobile data processing system includes a first data port, and the first data port is configured to communicate in accordance with a first data protocol.

The POS electronic system of this embodiment further comprises a first controller module configured to convert data between the first data protocol and an intermediate data protocol, and a second controller module configured to convert data between the intermediate protocol and a second data protocol.

The POS electronic system of this embodiment further comprises a peripheral device configured to facilitate the commercial transaction, the peripheral device including a second data port configured to communicate in accordance with the second data protocol.

In one embodiment, the commercial transaction is a restaurant transaction, and the peripheral device is configured to receive from the mobile data processing system at least one of the following: an identification marker of a food item; a price of a food item; an identification marker of a beverage item; a price of a beverage item; or a price of a meal.

In one embodiment, the commercial transaction is the sale of an item, and the peripheral device is configured to receive from the mobile data processing system at least one of the following: a price of the item, or an identification marker of the item.

In one embodiment, the mobile data processing system is a portable computer, which in various implementations may be an iPad, a tablet computer comprising a multi-touch display sensitive screen, a computer running the Android operating system, or any other computer, electronic tablet or mobile phone. In one embodiment, the intermediate protocol is an Ethernet communication protocol or any other TCP/IP protocol.

In one embodiment, the peripheral device is one of the following: a credit card reader; a barcode scanner; an RFID receiver configured to receive payment-related information from an RFID-enabled device; an image recognition device capable of identifying an object; a photo camera; or a video camera.

In one embodiment, the first data port includes at least one of the following: a serial data port; a parallel data port; a power pin; or a grounding pin.

In one embodiment, the peripheral device is a cash register or a coin dispenser, and the peripheral device is adapted to receive at least one instruction from the mobile data processing system or to transmit at least one item of data to the mobile data processing system.

In one embodiment, the mobile data processing system is configured to transmit to a local server system a dataset received from the peripheral device in substantially unmodified form.

In one embodiment, the mobile data processing system is configured to transmit to a central commerce server system a dataset received from the peripheral device. The transmission to the central commerce server system may take place over at least one of the following: a data network; a cellular network; a 3G or 4G data network; a Local Area Network (LAN); a TCP/IP connection; an Ethernet connection; a wireless network; or a satellite communication channel.

One embodiment provides a method for conducting a commercial transaction utilizing a POS electronic system. The method of this embodiment includes mediating the commercial transaction using a mobile data processing system and a peripheral device, with the mobile data processing system using a first data protocol and the peripheral device using a second data protocol.

The method of this embodiment further includes communicating data relating to the commercial transaction between the mobile data processing system and the peripheral device through a first controller module and through a second controller module. In this embodiment, the first controller module converts data between the first data protocol and an intermediate data protocol, and the second controller module converts data between the intermediate data protocol and the second data protocol.

In one embodiment, the commercial transaction is a restaurant transaction, and the peripheral device is configured to receive from the mobile data processing system at least one of the following: an identification marker of a food item; a price of a food item; an identification marker of a beverage item; a price of a beverage item; or a price of a meal.

In one embodiment, the commercial transaction is the sale of an item, and the peripheral device is configured to receive from the mobile data processing system at least one of the following: a price of the item, or an identification marker of the item.

In one embodiment, the mobile data processing system is a portable computer, which in various implementations may be an iPad, a tablet computer comprising a multi-touch display sensitive screen, a computer running the Android operating system, or any other computer, electronic tablet or mobile phone. In one embodiment, the intermediate protocol is an Ethernet communication protocol or any other TCP/IP protocol.

In one embodiment, the peripheral device is one of the following: a credit card reader; a barcode scanner; an RFID receiver configured to receive payment-related information from an RFID-enabled device; an image recognition device capable of identifying an object; a photo camera; or a video camera.

In one embodiment, the mobile data processing system includes a first data port, and the first data port includes at least one of the following: a serial data port; a parallel data port; a power pin; or a grounding pin.

In one embodiment, the peripheral device is a cash register or a coin dispenser, and the peripheral device is adapted to receive at least one instruction from the mobile data processing system or to transmit at least one item of data to the mobile data processing system.

In one embodiment, the mobile data processing system is configured to transmit to a local server system a dataset received from the peripheral device in substantially unmodified form.

In one embodiment, the mobile data processing system is configured to transmit to a central commerce server system a dataset received from the peripheral device. The transmission to the central commerce server system may take place over at least one of the following: a data network; a cellular network; a 3G or 4G data network; a Local Area Network (LAN); a TCP/IP connection; an Ethernet connection; a wireless network; or a satellite communication channel.

One embodiment provides a POS electronic system for conducting a commercial transaction comprising a mobile data processing system. In this embodiment, the mobile data processing system includes a data port and is configured to mediate a commercial transaction. The POS electronic system of this embodiment further includes a peripheral device configured to produce an output dataset as part of the commercial transaction. POS electronic system of this embodiment further includes a local server system coupled to the mobile data processing system. In this embodiment, the mediation of the commercial transaction by the mobile data processing system includes receiving at least a portion of the output dataset from the peripheral device through the data port and transmitting at least a portion of the received data to the local server system.

One embodiment provides a POS electronic system for conducting a commercial transaction comprising a mobile data processing system configured to mediate a commercial transaction. In this embodiment, the mobile data processing system comprises a data port that is not a USB port. The POS electronic system of this embodiment further includes a peripheral device configured to produce an output dataset as part of the commercial transaction. In this embodiment, the mediation of the commercial transaction by the mobile data processing system includes receiving at least a portion of a output dataset from the peripheral device through the data port.

One embodiment provides a POS electronic system for conducting a commercial transaction comprising a mobile data processing system configured to mediate a commercial transaction, the mobile data processing system including a data port. The POS electronic system of this embodiment further includes a peripheral device configured to produce an output dataset as part of the commercial transaction. The POS electronic system of this embodiment further includes a local server system coupled to the mobile data processing system and a central commerce server coupled to the local server system. In this embodiment, the mediation of the commercial transaction by the mobile data processing system includes receiving at least a portion of the output dataset from the peripheral device through the data port and transmitting at least a portion of the received data to the central commerce system via the local server system.

One embodiment provides an electronic communication method between a data processing system and a peripheral device. The method of this embodiment comprises receiving at a data conversion module an electronic datastream from the data processing system, the datastream formatted in accordance with a first protocol. The method of this embodiment further comprises using the data conversion module to convert at least a portion of the datastream from the first protocol into a second protocol. In this embodiment, the second protocol is suitable for direct interpretation by the peripheral device. The method of this embodiment further comprises transmitting to the peripheral device at least a portion of the data converted into the second protocol.

In one embodiment, the first protocol comprises printing instructions, the second protocol is a serial data transmission protocol, and the peripheral device is a printer.

In one embodiment, the peripheral device is an external display, the first protocol comprises instructions for displaying data onto the external display, and the second protocol is a protocol suitable for direct interpretation by the external display to display data onto the display.

In one embodiment, the data processing system is a tablet computer, possibly an iPad tablet computer or an Android tablet computer.

One embodiment provides an electronic communication method between a data processing system and a printer. The method of this embodiment includes receiving at a data conversion module an electronic datastream from the data processing system, the datastream formatted in accordance with a first protocol. The method of this embodiment further includes using the data conversion module to convert at least a portion of the datastream from the first protocol into a second protocol, wherein the second protocol is suitable for direct interpretation by the printer. The method of this embodiment further includes transmitting to the printer at least a portion of the data converted into the second protocol.

One embodiment provides an electronic communication method between a data processing system and an external display. The method of this embodiment includes receiving at a data conversion module an electronic datastream from the data processing system, the datastream formatted in accordance with a first protocol. The method of this embodiment further includes using the data conversion module to convert at least a portion of the datastream from the first protocol into a second protocol. In this embodiment, the second protocol is suitable for direct interpretation by the external display. The method of this embodiment further includes transmitting to the external display at least a portion of the data converted into the second protocol.

An embodiment provides a secured electronic communication method between a first data processing system and a second data processing system. The method of this embodiment comprises transmitting at least one synchronization data packet from the first data processing system to the second data processing system, the at least one synchronization data packet including a predefined payload. The method of this embodiment further comprises receiving the at least one synchronization data packet at the second data processing system and verifying that the payload of the at least one synchronization data packet satisfies a set of criteria. The method of this embodiment further comprises transmitting a at least one acknowledgement data packet from the second data processing system to the first data processing system if the verification is successful.

In one embodiment, the first data processing system is a client computer and the second data processing system is a server computer. In one embodiment, the first data processing system is a tablet computer and the second data processing system is a server computer. In one embodiment, the first data processing system is an iPad tablet computer and the second data processing system is a server computer. In one embodiment, the first data processing system is a local server system connected to a tablet computer, and the second data processing system is a server computer.

One embodiment provides a secured electronic communication method between a first data processing system and a second data processing system. The method of this embodiment comprises transmitting a set of synchronization data packet from the first data processing system to the second data processing system, where at least a subset of the data packets include a predefined payload. The method of this embodiment further comprises receiving the set of synchronization data packets at the second data processing system and verifying that the payloads of the at least a subset of the data packets satisfy a corresponding criteria. The method of this embodiment further comprises transmitting a at least one acknowledgement data packet from the second data processing system to the first data processing system if the verification is successful.

An embodiment provides an electronic communication method between a data processing system and a peripheral device. The method of this embodiment comprises receiving at a controller module an electronic datastream from the peripheral device, the datastream formatted in accordance with a first protocol. The method of this embodiment further comprises using the controller module to convert at least a portion of the datastream from the first protocol into a second protocol, wherein the second protocol is compatible with an data port of the data processing system. The method of this embodiment further comprises transmitting to the data port of the data processing system at least a portion of the data converted into the second protocol.

In one embodiment, the first protocol is a USB protocol, the second protocol is a serial data transmission protocol, and the data processing system is a tablet computer. In one embodiment, the first protocol is a USB protocol, the second protocol is a serial data transmission protocol, and the data processing system is an iPad tablet computer. In one embodiment, the first protocol is a USB protocol, the second protocol is a serial data transmission protocol, and the peripheral device is a credit card reader. In one embodiment, the first protocol is a USB protocol, the second protocol is a serial data transmission protocol, and the peripheral device is bar scanner.

INCORPORATION BY REFERENCE

All publications, patents, and patent applications mentioned in this specification, if any, are herein incorporated by reference to the same extent as if each such individual publication, patent, or patent application were specifically and individually indicated to be incorporated by reference. To the extent that any inconsistency or conflict may exist between information disclosed in this patent and information disclosed in any publications, patents, or patent applications that are incorporated by reference in this patent, the information disclosed in this patent will take precedence and prevail.

BRIEF DESCRIPTION OF THE DRAWINGS

The accompanying figures, which together with the detailed description below are incorporated in and form part of the specification, serve to further illustrate various embodiments and to explain various principles and advantages all in accordance with example embodiments of the present inventions. References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3B shows a data TCP stream that is sent to a printer device to enable it to print information on paper, in accordance with an embodiment.

FIG. 3C shows a local display is able to display to a user corresponding characters, symbols and/or graphics upon receiving packets of data.

FIG. 4B shows a communication system protocol and sequence of messages that establishes an open communication channel without relying on open communication ports, in accordance with an embodiment.

FIG. 10 shows an exemplary set of instructions that may be used by a data processing system to communicate with a peripheral device using a customized data protocol in accordance with an embodiment.

DETAILED DESCRIPTION OF THE PREFERRED EMBODIMENTS

Figure 1:
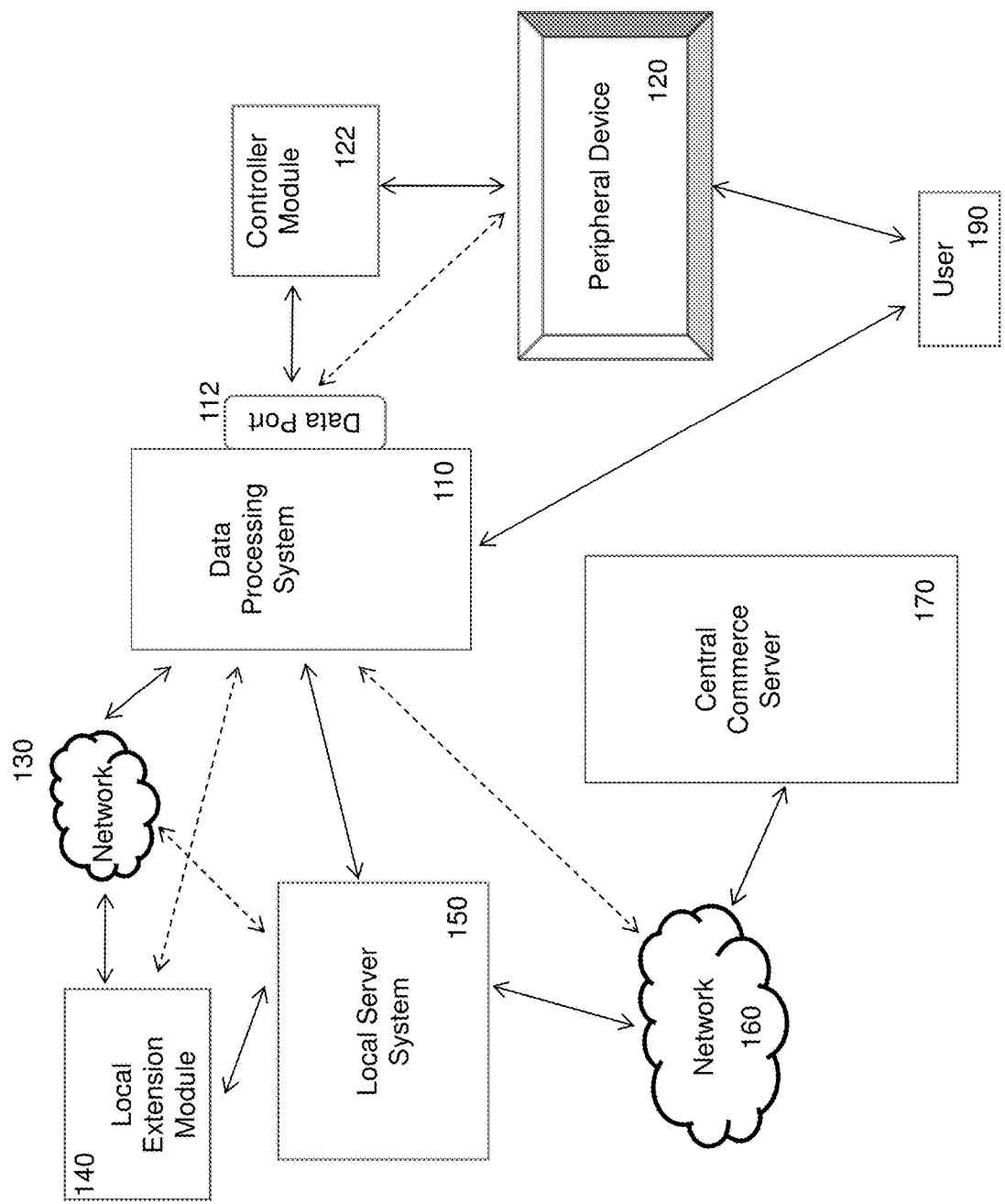
FIG. 1 shows an exemplary point of sale system in accordance with an embodiment.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

While the specification concludes with claims defining the features of the invention that are regarded as novel, the invention will be better understood from a consideration of the following description in conjunction with the drawing figures, in which like reference numerals are carried forward.

FIG. 1 shows an exemplary point of sale system in accordance with an embodiment.

Examples of point of sale (sometimes denoted "POS") transactions that may be handled by various embodiments disclosed or claimed in this patent include sales of items in retail environments (e.g., sale of a book in a bookstore, food item sales in a grocery store, conducting an Internet purchase or other Internet-based transaction from a stationary or mobile POS terminal), management of services and customer payments in a commercial establishment (e.g., conducting a restaurant transaction where a waiter processes orders from customers and handles corresponding payments), financial transactions (e.g., a bank representative handling a financial transaction for a customer), and any other transaction that involves management of information transmitted between a customer and a retail representative and/or handling of a payment for an item or service.

The exemplary point of sale system illustrated in the embodiment of FIG. 1 includes a data processing system 110, a peripheral device 120, and a central commerce server 170.

In one embodiment, the data processing system 110 is a tablet computer comprising a touch-sensitive (also denoted multi-touch-screen or touch-screen) display sensitive screen. In one implementation, the data processing system 110 is an iPad tablet computer currently commercialized by Apple Inc. In one implementation, the data processing system 110 is a tablet computer running the Android operating system currently developed by Google Inc. In one implementation, the data processing system 110 is a mobile phone. In one implementation, the data processing system 110 is any other device capable of conducting or facilitating a commercial transaction involving direct or indirect transmission of data. Further details regarding various embodiments of the data processing system 110 are provided in connection with the embodiment of FIG. 2.

In the embodiment of FIG. 1, the data processing system 110 comprises a data port 112. The data port 112 facilitates data transmissions between the data processing system 110 and the peripheral device 120, either directly or through a controller module 122.

The peripheral device 120 from the embodiment of FIG. 1 could perform a variety of functions in connection with point of sale transactions. In one implementation, the peripheral device 120 is a credit card reader that is configured to read a credit card, debit card, gift card, rewards card, points card, or any other card or tangible instrument for making a payment, whether based on a magnetic stripe technology or on another contact or contactless technology. In one implementation, the peripheral device 120 is a barcode scanner configured to read barcode data. In one implementation, the peripheral device 120 is an RFID receiver configured to receive payment-related information from an RFID-enabled device. In one implementation, the peripheral device 120 is a receiver configured to receive payment-related information from a mobile phone or other personal communication device via a wireless transmission (e.g., using a WiFi connection, using a connection established over a cell phone network, using a wireless USB connection, or using any other transmission protocol that may be implemented in a mobile phone or other personal communication device). In one implementation, the peripheral device 120 is a camera or other device capable of performing or facilitating image recognition (e.g., a camera or an optical scanner capable of identifying an object (examples of such objection include a tool being sold in a hardware store, a check being cashed in a bank, an application or other form being submitted in an administrative setting, etc.), identifying a human (e.g., verifying the identity of a customer making a payment), or interpreting other visual information (e.g., performing character recognition for information written on an object being sold). In one implementation, the peripheral device 120 is a photo camera or a video camera.

In the embodiment of FIG. 1, a user 190 interacts with the peripheral device 120. For example, the user 190 could be a waiter that utilizes the peripheral device 120 (e.g., a credit card reader) to receive payment from a group of restaurant customers at the end of a meal. As another example, the user 190 could be a sales clerk in a convenience store that utilizes the peripheral device 120 (e.g., a barcode scanner) to identify an object being purchased by a customer.

In one embodiment, there are more than one peripheral devices coupled to the data processing system 110, in addition to the peripheral device 120 shown in the exemplary embodiment of FIG. 1. For example, a sales clerk in a grocery store could utilize in the course of one or more point of sale transactions a peripheral device 120 consisting of a barcode scanner to scan the price of an item and a peripheral device 120 consisting of a credit card reader to receive a credit card payment from a customer, with the information obtained by the barcode scanner and by the credit card reader being transmitted to the data processing system 110 either directly or through the controller 122.

Examples of information that could be included in a dataset communicated between the data processing system 110 (whether deployed as a mobile data processing system or as a fixed data processing system) and one or more peripheral devices (such as the peripheral device 120) include an identification marker of a food item, a price of a food item, an identification marker of a beverage item, a price of a beverage item, a price of a meal, a price of an item being sold, an identification marker of an item being sold, or any other characteristic or attribute of any item that is the subject of a POS transaction and that is commonly used to identify and/or process that item. Such communication between a data processing system and a peripheral device may include transmission from the data processing system to the peripheral device and/or transmission from the peripheral device to the data processing system.

In general, a mobile data processing system deployed as the data processing system 110 may include any data processing system that can be used as a portable device (e.g., any electronic tablet such as an iPad or Android tablet, any mobile phone, any other portable computer, etc.). A common attribute of such mobile data processing systems is potential mobility (i.e., the mobile data processing system could possibly be removed from a docking station or other resting location).

In one embodiment, the peripheral device 120 shown in the exemplary embodiment of FIG. 1 comprises multiple peripheral devices (e.g., both a credit card reader and a touch-screen device that permits a waiter to input information regarding an order placed by a restaurant guest).

In one embodiment, the peripheral device 120 shown in the exemplary embodiment of FIG. 1 consists of a single integrated unit that is capable of performing the functions of multiple peripheral devices (e.g., the peripheral device 120 could incorporate both credit card reader functionality and bar code reader functionality).

In one embodiment, the peripheral device 120 transmits information received as part of the point of sale transaction to the data processing system 110 immediately (e.g., a credit card reader would transmit the credit card information upon the card being swiped). In one embodiment, the peripheral device 120 transmits information received as part of the point of sale transaction to the data processing system 110 at a later time (e.g., a credit card reader could buffer and store information regarding the credit cards swiped until a later time, for example until the credit card reader is docked via a wired connection to the data processing system 110 or is in closer proximity with the data processing system 110.

In one embodiment, the controller 122 mediates information transmitted between the peripheral device 120 and the data processing system 110. In one embodiment, the controller module 122 receives information formatted in accordance with a first data protocol from the peripheral device 120, converts at least part of such information into information formatted in accordance with a second data protocol, and then transmits at least part of the information formatted in accordance with the second data protocol to the data processing system 110. In one implementation, the controller module 122 converts information received through a USB connection from the peripheral device 120 to serial data, and then sends at least part of the converted serial data to the data port 112 of the data processing system 110. More details regarding the controller module 122 are provided below, including in connection with the embodiments of FIG. 5A and FIG. 5B.

In one embodiment, the controller module 122 is integrated in the peripheral device 120. In one embodiment, the controller module 122 is integrated in the data processing system 110. In one embodiment, the controller module 122 is a stand-alone unit coupled to the peripheral device 120 and the data processing system 110 through one or more communication channels or data networks. In one embodiment, the controller module 122 is a stand-alone unit that could be coupled to the peripheral device 120 through a wired communication channel and to the data processing system 110 through a wireless communication channel (whether at the same time or at different times).

In various embodiments, the connection between one or more peripheral devices 120 and the data processing system 110 could be wired or wireless. In one implementation, a controller module 122 is connected via a USB connection to the peripheral device 120 and via a wireless connection to the data processing system 110. In one implementation, a controller module 122 is connected via a USB connection to the peripheral device 120 and via a serial, wired connection to the data processing system 110. In one implementation, a controller module 122 is connected via one or more wireless networks (e.g., WiFi, cellular phone and/or data network, etc.) and/or via one or more wireless communication channels (e.g., wired USB connection, wireless USB connection, and/or Bluetooth connection, etc.) to both the peripheral device 120 and the data processing system 110.

In the embodiment of FIG. 1, the data processing system 110 receives information from the peripheral device 120, directly and/or through the controller module 122, and utilizes at least part of the received information to facilitate the respective point of sale transaction. For example, the data processing system 110 could run a software program that processes payment data received from a credit card reader deployed as peripheral device 120 and correlates such payment data with additional information entered by the user 190 regarding the respective transaction (e.g., correlate payment information with a restaurant order and bill entered by a restaurant waiter into the data processing system 110).

In one embodiment, the user 190 interacts with the data processing system 110 by entering information directly into the data processing system 110 (e.g., via a graphical user interface provided by a display integrated into the data processing system 110 or otherwise connected with the data processing system 110). For example, a restaurant waiter could carry the data processing system 110 (e.g., a mobile touch-screen device) to a table, then use a graphical user interface shown on the touch-screen to enter information about the various food and beverage selections made by customers sitting at that table, and later use a graphical user interface shown on the touch-screen of the data processing system 110 and/or the peripheral device 120 to generate a final bill and process a payment from the respective customers).

In one embodiment, the user 190 interacts with the data processing system 110 by entering information into the data processing system 110 through a peripheral device 120 that includes data input capabilities (e.g., a portable palm-sized touch-screen portable terminal with a suitable graphical user interface, a portable terminal comprising an LCD display that further comprises a keyboard). For example, in a restaurant, a waiter may not carry the data processing system 110 to a table, but may instead rely on a smaller mobile terminal deployed as the peripheral device 120 (e.g., a touch-screen device the size of a smartphone) to enter and process orders from the respective customers.

In one embodiment, upon processing information received from the peripheral device 120 and/or the user 190, the data processing system 110 transmits processed information to a local extension module 140, a local server system 150, and/or a central commerce server 170.

In one embodiment, the local extension module 140 is a peripheral device that provides support for point of sale transactions, such as printing information, storing data, scanning documents, faxing documents, or buffering data for further transmission to other local or remote devices. In one embodiment, the local extension module 140 is a printer that can print out or otherwise generate receipts, records of transactions, bills, invoices or any other documents or information produced or processed by the data processing system 110 or by the local server system 150. In one embodiment, the local extension module 140 (e.g., a printer, a logic module, a computer, or another data processing system) is configured to open a cash drawer incorporated in the local server system 150. Opening the cash drawer in this embodiment may take place automatically (e.g., automatically triggered by a specific printing transaction), or may be initiated independently by an instruction transmitted by the data processing system 110. Further details regarding data communications between the local extension module 140 and the data processing system 110 in accordance with an embodiment of the invention are provided in connection with the embodiment of FIG. 3A.

In various embodiments, the local extension module 140 may consist of a stand-alone device with substantially singular functionality (e.g., a printer), an integrated data processing system with multiple functionalities (e.g., an integrated business center system that includes copier, scanner, faxing and/or printing functionality), or a combination of such stand-alone devices and/or integrated devices. In one embodiment, the local extension module 140 is a display that shows to a retail representative and/or to a customer details regarding the point of sale transaction (e.g., the names, numbers and prices of items being sold in a grocery store).

In various embodiments, the data processed by the local extension module 140 may be obtained from the data processing system 110 or from the local server system 150.

In one embodiment, the local server system 150 is a data processing system that provides support for point of sale transactions, such as acting as a local server, storing or buffering data, providing network administration and/or security functionality, routing electronic traffic between external systems and the data processing system 110 or other local devices (e.g., a gateway or router), providing cash register functionality (e.g., managing hard currency transactions and issuance of change in bills and coins), and detecting, preventing and reporting fraud.

In one embodiment, the local server system 150 is a cash register coupled to the data processing system 110 through a docking station. In various implementations (e.g., as discussed in connection the embodiments of FIGS. 6, 7 and 8), a docking station could provide a place for a mobile device deployed as the data processing system 110 to be placed for recharging, temporary storage, or for handling point of sale transactions in a stationary configuration. In one implementation, a docking station provides a locking mechanism (e.g., a direct connector, a steel cable, a sensor device, etc.) to secure the data processing system 110 against theft or other tempering. An example of a data processing system 110 consisting of an iPad tablet computer commercialized by Apple Inc. that is configured to conduct a point of sale transaction by being coupled with a local server system 150 consisting of a cash register is shown in FIG. 8.

Communications between the data processing system 110, the local extension module 140 and the local server system 150 could take place via a network 130 (e.g., a wired local area network (LAN) or a WiFi wireless network), via one or more communication channels (e.g., wired and/or wireless USB connections, Bluetooth connection), or via a combination of networks and communication channels. Such communications could be non-encrypted, encrypted, or using any other security or proprietary protocol. In general, communications between various elements shown in FIG. 1 could take place over any combination of such networks or communication channels. Additional discussion of data networks and communication channels is provided in connection with the embodiment of FIG. 2.

In general, any particular connection between elements shown in the embodiment of FIG. 1 could be implemented using alternative routes or data protocols. For example, the connection between the data processing system 110 and the local server system 150 could be achieved directly, through the network 130, through the local extension module 140 (the connection between the data processing system 110 and the local extension module 140 is shown with a dotted line in FIG. 1 to suggest that it could be an optional connection, but in general to the extent that any particular connection is replaceable, that particular connection could be considered optional), or through both the network 130 and the local extension module 140. When acting as an intermediate device in a connection between two or more other devices, any element shown in the embodiment of FIG. 1 could pass information through unchanged or could process or otherwise convert some or all of that information before relaying it further. In one embodiment, communications between two or more of the elements shown in FIG. 1 are encrypted, and the respective devices include logic modules (e.g., software) adapted to decrypt and/or encrypt data.

In one embodiment, the local server system 150 transmits information regarding the point of sale transaction to a central commerce server 170. Such information may include payment information provided by the user 190 in an attempt to validate that information and secure payment from a financial institution to complete the respective point of sale transaction. For example, the local server system 150 could transmit a credit card payment request to the central commerce server 170 after the credit card of the user 190 was swiped through the peripheral device 120.

In one embodiment, the data processing system 110 may itself directly transmit information regarding the point of sale transaction to the central commerce server 170, without the assistance of the local server system 150. This may happen, for example, if the relevant functionality of the local sever system 150 is implemented directly in the data processing system 110, or in a case where the local server system 150 is configured to act as an intermediary in the course of normal operation but becomes temporarily unavailable and the data processing system 110 is able to communicate with the central commerce server 170 directly).

In one embodiment, the information transmitted by the data processing system 110 and/or the local system 150 to the central commerce server 170 in connection with a point of sale transaction includes payment data provided by the user 190 in an attempt to secure payment from a financial institution to complete the respective point of sale transaction. For example, the data processing system 110 could transmit a credit card payment request to the central commerce server 170 after the credit card of the user 190 was swiped through the peripheral device 120.

Communications with the central commerce server 170 may take place via a network 160 (e.g., the Internet, a cellular data network, etc.). Further examples of suitable data networks are provided in connection with the embodiment of FIG. 2.

In one embodiment, the central commerce server 170 is a data processing system that is configured to manage financial transactions in support of point of sale transactions conducted at remote locations, such as point of sale transactions conducted using the data processing system 110. In one embodiment, the central commerce server 170 relays to a financial institution (not shown in FIG. 1) a credit card payment request from the data processing system 110 and/or the local server system 150 regarding a purchase made by the user 190, then receives a payment authorization from the financial institution, and then relays the respective payment authorization to the data processing system 110 to indicate that the purchase by the user 190 has been funded. In one embodiment, the central commerce server 170 does not relay payment requests to any external financial institutions, but is instead configured to directly approve or decline the respective payment requests (e.g., when the central payment server 170 is itself operated by an entity that has the ability to authorize financial payments).

In one embodiment, the central commerce server 170 is protected with various security layers. In one implementation, the central commerce server 170 is protected with a software security system that locks IP addresses and prevents unauthorized third parties from accessing the central commerce server 170. In one implementation, each of the data processing systems 110 from various point of system locations has an authentication code, possibly unique, and the central commerce server 170 is configured to only accept connections from devices that provide the respective authentication codes. By eliminating or restricting connections initiated by unauthorized devices, the central commerce server 170 experiences a higher degree of security.

In one embodiment, a single retail location (e.g., a restaurant or store) has a plurality of data processing systems 110 (e.g., two or more restaurant mobile terminals, two or more store retail registers, etc.), and the various data processing systems 110 are configured to communicate with each other and/or with the various other elements shown in FIG. 1. For example, a waiter in a restaurant may utilize a particular data processing system 110 to receive an order from a group of customers, and then may utilize another data processing system 110 to update the order and/or to generate a final bill. In one embodiment, there are a plurality of data processing systems corresponding to various other elements shown in FIG. 1 (e.g., a retail location may have two or more local extension modules 140, two or more local server systems 150, etc.). In one embodiment, the functionality of various elements shown in FIG. 1 is integrated in a data processing system 110 (e.g., a restaurant mobile terminal could include the functionality of the local server system 150 and may be able to communicate with the central commerce server 170 over the network 160. In general, incorporating additional functionality in data processing system 110 may increase the cost of each such device, but may also provide improved reliability for the respective POS retail system by increasing the redundancies and failure resilience of the POS retail system.

Figure 2:
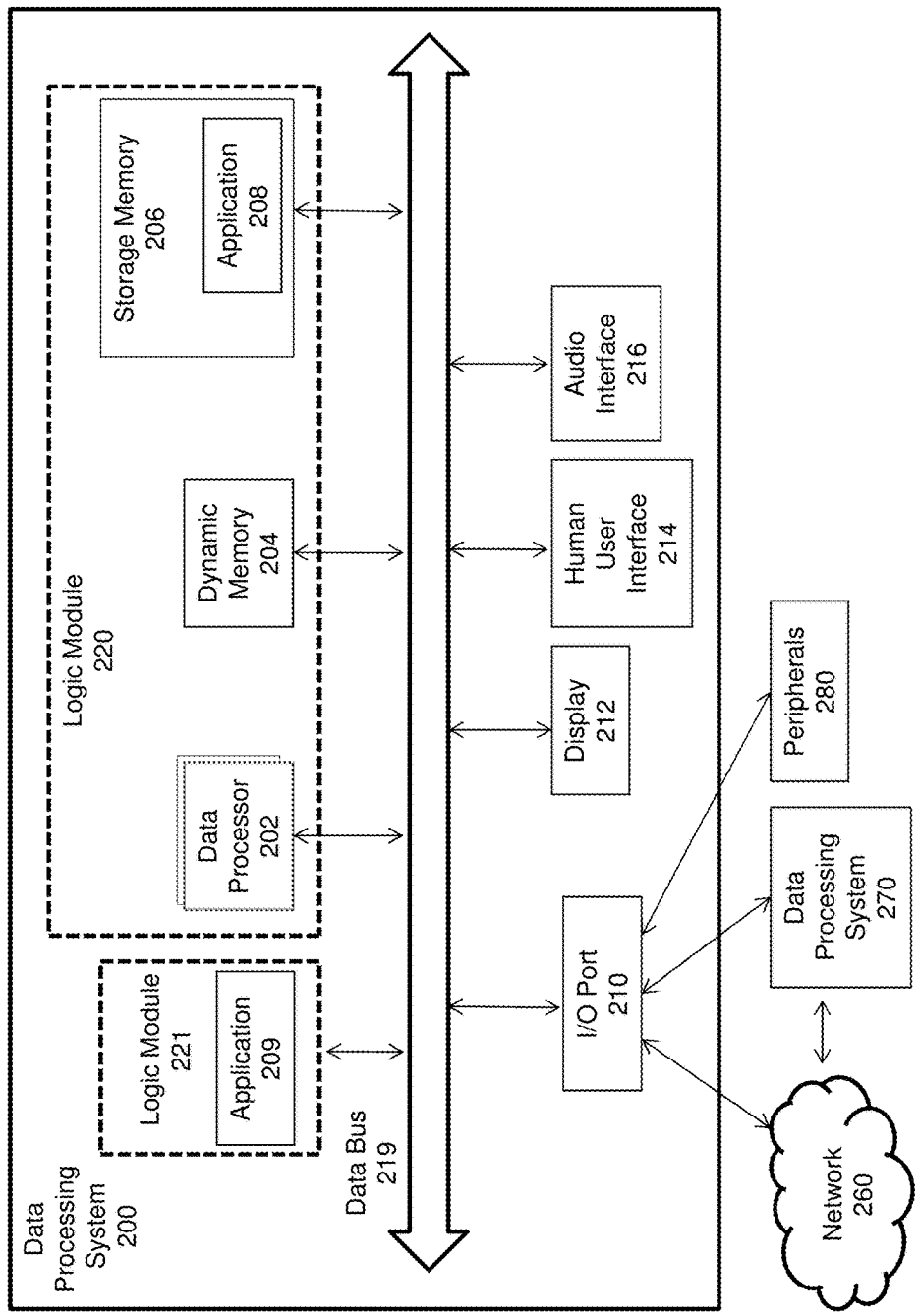
FIG. 2 shows a representation of an exemplary data processing system that may be used in connection with various embodiments.

FIG. 2 shows a representation of an exemplary data processing system 200 that may be used in connection with various embodiments described and/or claimed in this patent and which may be configured to execute instructions for performing functions and methods described and/or claimed in this patent. In one implementation, the data processing system 200 represents the data processing system 110 from the embodiment of FIG. 1. In one implementation, the data processing system 200 is a tablet computer comprising a multi-touch display sensitive screen, such as an iPad tablet computer currently commercialized by Apple Inc., a tablet computer running the Android operating system currently developed by Google Inc., a mobile phone, or another mobile personal communication device. In various implementations, the data processing system 200 may be the peripheral device 120, local server system 150 and/or the central commerce server 170 from the embodiment of FIG. 1.

The exemplary data processing system 200 includes a data processor 202. The data processor 202 represents one or more general-purpose data processing devices such as a microprocessor or other central processing unit. More particularly, the processing device may be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets, whether in a single core or in a multiple core architecture. Data processor 202 may also be or include one or more special-purpose processing devices such as an application specific integrated circuit (ASIC), a field programmable gate array (FPGA), a digital signal processor (DSP), network processor, any other embedded processor, or the like. The data processor 202 may execute instructions for performing operations and steps in connection with various embodiments of the present invention.

In this exemplary embodiment, the data processing system 200 further includes a dynamic memory 204, which may be designed to provide higher data read speeds. Examples of dynamic memory 204 include dynamic random access memory (DRAM), synchronous DRAM (SDRAM) memory, read-only memory (ROM) and flash memory. The dynamic memory 204 may be adapted to store all or part of the instructions of a software application, as these instructions are being executed or may be scheduled for execution by data processor 202. In some implementations, the dynamic memory 204 may include one or more cache memory systems that are designed to facilitate lower latency data access by the data processor 202.

In general, unless otherwise stated or required by the context, when used in this patent in connection with a method or process, data processing system, or logic module, the words "adapted" and "configured" are intended to describe that the respective method, data processing system or logic module is capable of performing the respective functions by being appropriately adapted or configured (e.g., via programming, via the addition of relevant components or interfaces, etc.), but are not intended to suggest that the respective method, data processing system or logic module is not capable of performing other functions. For example, unless otherwise expressly stated, a logic module that is described as being adapted to process a specific class of information will not be construed to be exclusively adapted to process only that specific class of information, but may in fact be able to process other classes of information and to perform additional functions (e.g., receiving, transmitting, converting, or otherwise processing or manipulating information).

In this exemplary embodiment, the data processing system 200 further includes a storage memory 206, which may be designed to store larger amounts of data. Examples of storage memory 206 include a magnetic hard disk and a flash memory module. In various implementations, the data processing system 200 may also include, or may otherwise be configured to access one or more external storage memories, such as an external memory database or other memory data bank, which may either be accessible via a local connection (e.g., a wired or wireless USB, Bluetooth, or WiFi interface), or via a network (e.g., a remote cloud-based memory volume).

A storage memory may also be denoted a memory medium, storage medium, dynamic memory, or memory. In general, a storage memory, such as the dynamic memory 204 and the storage memory 206, may include any chip, device, combination of chips and/or devices, or other structure capable of storing electronic information, whether temporarily, permanently or quasi-permanently. A memory medium could be based on any magnetic, optical, electrical, mechanical, electromechanical, MEMS, quantum, or chemical technology, or any other technology or combination of the foregoing that is capable of storing electronic information. A memory medium could be centralized, distributed, local, remote, portable, or any combination of the foregoing. Examples of memory media include a magnetic hard disk, a random access memory (RAM) module, an optical disk (e.g., DVD, CD), and a flash memory card, stick, disk or module.

A software application or module, and any other computer executable instructions, may be stored on any such storage memory, whether permanently or temporarily, including on any type of disk (e.g., a floppy disk, optical disk, CD-ROM, and other magnetic-optical disks), read-only memory (ROM), random access memory (RAM), EPROM, EEPROM, magnetic or optical card, or any other type of media suitable for storing electronic instructions.

In general, a storage memory could host a database, or a part of a database. Conversely, in general, a database could be stored completely on a particular storage memory, could be distributed across a plurality of storage memories, or could be stored on one particular storage memory and backed up or otherwise replicated over a set of other storage memories. Examples of databases include operational databases, analytical databases, data warehouses, distributed databases, end-user databases, external databases, hypermedia databases, navigational databases, in-memory databases, document-oriented databases, real-time databases and relational databases.

Storage memory 206 may include one or more software applications 208, in whole or in part, stored thereon. In general, a software application, also denoted a data processing application or an application, may include any software application, software module, function, procedure, method, class, process, or any other set of software instructions, whether implemented in programming code, firmware, or any combination of the foregoing. A software application may be in source code, assembly code, object code, or any other format. In various implementations, an application may run on more than one data processing system (e.g., using a distributed data processing model or operating in a computing cloud), or may run on a particular data processing system or logic module and may output data through one or more other data processing systems or logic modules.

The exemplary data processing system 200 may include one or more logic modules 220 and/or 221, also denoted data processing modules, or modules. Each logic module 220 and/or 221 may consist of (a) any software application, (b) any portion of any software application, where such portion can process data, (c) any data processing system, (d) any component or portion of any data processing system, where such component or portion can process data, and (e) any combination of the foregoing. In general, a logic module may be configured to perform instructions and to carry out the functionality of one or more embodiments of the present invention, whether alone or in combination with other data processing modules or with other devices or applications. Logic modules 220 and 221 are shown with dotted lines in FIG. 2 to further emphasize that data processing system 200 may include one or more logic modules, but does not have to necessarily include more than one logic module.

As an example of a logic module comprising software, logic module 221 shown in FIG. 2 consists of application 209, which may consist of one or more software programs and/or software modules. Logic module 221 may perform one or more functions if loaded on a data processing system or on a logic module that comprises a data processor.

As an example of a logic module comprising hardware, the data processor 202, dynamic memory 204 and storage memory 206 may be included in a logic module, shown in FIG. 2 as exemplary logic module 220. Examples of data processing systems that may incorporate both logic modules comprising software and logic modules comprising hardware include a desktop computer, a mobile computer, or a server computer, each being capable of running software to perform one or more functions defined in the respective software.

In general, functionality of logic modules may be consolidated in fewer logic modules (e.g., in a single logic module), or may be distributed among a larger set of logic modules. For example, separate logic modules performing a specific set of functions may be equivalent with fewer or a single logic module performing the same set of functions. Conversely, a single logic module performing a set of functions may be equivalent with a plurality of logic modules that together perform the same set of functions. In the data processing system 200 shown in FIG. 2, logic module 220 and logic module 221 may be independent modules and may perform specific functions independent of each other. In an alternative embodiment, logic module 220 and logic module 221 may be combined in whole or in part in a single module that perform their combined functionality. In an alternative embodiment, the functionality of logic module 220 and logic module 221 may be distributed among any number of logic modules. One way to distribute functionality of one or more original logic modules among different substitute logic modules is to reconfigure the software and/or hardware components of the original logic modules. Another way to distribute functionality of one or more original logic modules among different substitute logic modules is to reconfigure software executing on the original logic modules so that it executes in a different configuration on the substitute logic modules while still achieving substantially the same functionality. Examples of logic modules that incorporate the functionality of multiple logic modules and therefore can be construed themselves as logic modules include system-on-a-chip (SoC) devices and a package on package (PoP) devices, where the integration of logic modules may be achieved in a planar direction (e.g., a processor and a storage memory disposed in the same general layer of a packaged device) and/or in a vertical direction (e.g. using two or more stacked layers).

The exemplary data processing system 200 may further include one or more input/output (I/O) ports 210 for communicating with other data processing systems 270, with other peripherals 280, or with one or more networks 260. Each I/O port 210 may be configured to operate using one or more communication protocols. In general, each I/O port 210 may be able to communicate through one or more communication channels. The data processing system 200 may communicate directly with other data processing systems 270 (e.g., via a direct wireless or wired connection), or via the one or more networks 260.

A communication channel may include any direct or indirect data connection path, including any connection using a wireless technology (e.g., Bluetooth, infrared, WiFi, WiMAX, cellular, 3G, 4G, EDGE, CDMA and DECT), any connection using wired technology (including via any serial, parallel, wired packet-based communication protocol (e.g., Ethernet, USB, FireWire, etc.), or other wireline connection), any optical channel (e.g., via a fiber optic connection or via a line-of-sight laser or LED connection), and any other point-to-point connection capable of transmitting data.

Each of the networks 260 may include one or more communication channels. In general, a network, or data network, consists of one or more communication channels. Examples of networks include LANs, MANs, WANs, cellular and mobile telephony networks, the Internet, the World Wide Web, and any other information transmission network. In various implementations, the data processing system 200 may include interfaces and communication ports in addition to the I/O ports 210.

The exemplary data processing system 200 may further include a display 212, which provides the ability for a user to visualize data output by the data processing system 200 and/or to interact with the data processing system 200. The display 212 may directly or indirectly provide a graphical user interface (GUI) adapted to facilitate presentation of data to a user and/or to accept input from a user. The display 212 may consist of a set of visual displays (e.g., an integrated LCD, LED or CRT display), a set of external visual displays, (e.g., an LCD display, an optical projection device, a holographic display), or of a combination of the foregoing.

A visual display may also be denoted a graphic display, computer display, display, computer screen, screen, computer panel, or panel. Examples of displays include a computer monitor, an integrated computer display, electronic paper, a flexible display, a touch panel, a transparent display, and a three dimensional (3D) display that may or may not require a user to wear assistive 3D glasses.

A data processing system may incorporate a graphic display. Examples of such data processing systems include a laptop, a computer pad or notepad, a tablet computer, an electronic reader (also denoted an e-reader or ereader), a smart phone, a personal data assistant (PDA).

A data processing system may be connected to an external graphic display. Examples of such data processing systems include a desktop computer, a server, an embedded data processing system, or any other data processing system that does not itself include a display but which produces data that may be shown to a user. A data processing system that incorporates a graphic display may also be connected to an external display. A data processing system may directly display data on an external display, or may transmit data to other data processing systems or logic modules that will eventually display data on an external display.

Graphic displays may include active display, passive displays, LCD displays, LED displays, OLED displays, plasma displays, and any other type of visual display that is capable of displaying electronic information to a user. Such graphic displays may permit direct interaction with a user, either through direct touch by the user (e.g. a touch-screen display that can sense a user's finger touching a particular area of the display), through proximity interaction with a user (e.g., sensing a user's finger being in proximity to a particular area of the display), or through a stylus or other input device. In one implementation, the display 212 is a touch-screen display that displays a human GUI interface to a user, with the user being able to control the data processing system 200 through the human GUI interface, or to otherwise interact with, or input data into the data processing system 200 through the human GUI interface.

The exemplary data processing system 200 may further include one or more human input interfaces 214, which facilitate data entry by a user or other interaction by a user with the data processing system 200. Examples of human input devices 214 include a keyboard, a mouse (whether wired or wireless), a stylus, other wired or wireless pointer devices (e.g., a remote control), or any other user device capable of interfacing with the data processing system 200. In some implementations, human input devices 214 may include one or more sensors that provide the ability for a user to interface with the data processing system 200 via voice, or provide user intention recognition technology (including optical, facial, or gesture recognition), or gesture recognition (e.g., recognizing a set of gestures based on movement via motion sensors such as gyroscopes, accelerometers, magnetic sensors, optical sensors, etc.).

The exemplary data processing system 200 may further include one or more gyroscopes, accelerometers, magnetic sensors, optical sensors, or other sensors that are capable of detecting physical movement of the data processing system. Such movement may include larger amplitude movements (e.g., a device being lifted by a user off a table and carried away or elevation changes experienced by the data processing system), smaller amplitude movements (e.g., a device being brought closer to the face of a user or otherwise being moved in front of a user while the user is viewing content on the display, movement experienced by a vehicle within which the data processing system is located), or higher frequency movements (e.g., hand tremor of a human, vibrations caused by an engine). In the absence of internal motion sensors, or in addition to any internal motion sensors, the exemplary data processing system 200 may further be capable of receiving and processing information from external motion sensors such as gyroscopes, accelerometers, magnetic sensors, optical sensors, or other sensors that are capable of detecting physical movement of the data processing system.

The exemplary data processing system 200 may further include an audio interface 216, which provides the ability for the data processing system 200 to output sound (e.g., a speaker), to input sound (e.g., a microphone), or any combination of the foregoing.

The exemplary data processing system 200 may further include any other components that may be advantageously used in connection with receiving, processing and/or transmitting information.

In the exemplary data processing system 200, the data processor 202, dynamic memory 204, storage memory 206, I/O port 210, display 212, human input interface 214, audio interface 216, and logic module 221 communicate to each other via the data bus 219. In some implementations, there may be one or more data buses in addition to the data bus 219 that connect some or all of the components of data processing system 200, including possibly dedicated data buses that connect only a subset of such components. Each such data bus may implement open industry protocols (e.g., a PCI or PCI-Express data bus), or may implement proprietary protocols.

Some of the embodiments described in this specification may be presented in terms of algorithms and symbolic representations of operations on data bits within a computer memory. In general, an algorithm represents a sequence of steps leading to a desired result. Such steps generally require physical manipulations of physical quantities. Usually, though not necessarily, these quantities take the form of electrical or magnetic signals capable of being stored, transferred, combined, compared, and otherwise manipulated using appropriate electronic devices. Such signals may be denoted as bits, values, elements, symbols, characters, terms, numbers, or using other similar terminology.

When used in connection with the manipulation of electronic data, terms such as processing, computing, calculating, determining, displaying, or the like, refer to the action and processes of a computer system or other electronic system that manipulates and transforms data represented as physical (electronic) quantities within the system's registers and memories into other data similarly represented as physical quantities within the memories or registers of that system of or other information storage, transmission or display devices.

Various embodiments of the present invention may be implemented using an apparatus or machine that executes programming instructions. Such an apparatus or machine may be specially constructed for the required purposes, or may comprise a general purpose computer selectively activated or reconfigured by a software application.

Algorithms discussed in connection with various embodiments of the present invention are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description provided in connection with the various embodiments discussed in this patent. In addition, embodiments of the present invention are not described with reference to any particular programming language, data transmission protocol, or data storage protocol. Instead, a variety of programming languages, transmission or storage protocols may be used to implement various embodiments of the invention.

Figure 3A:
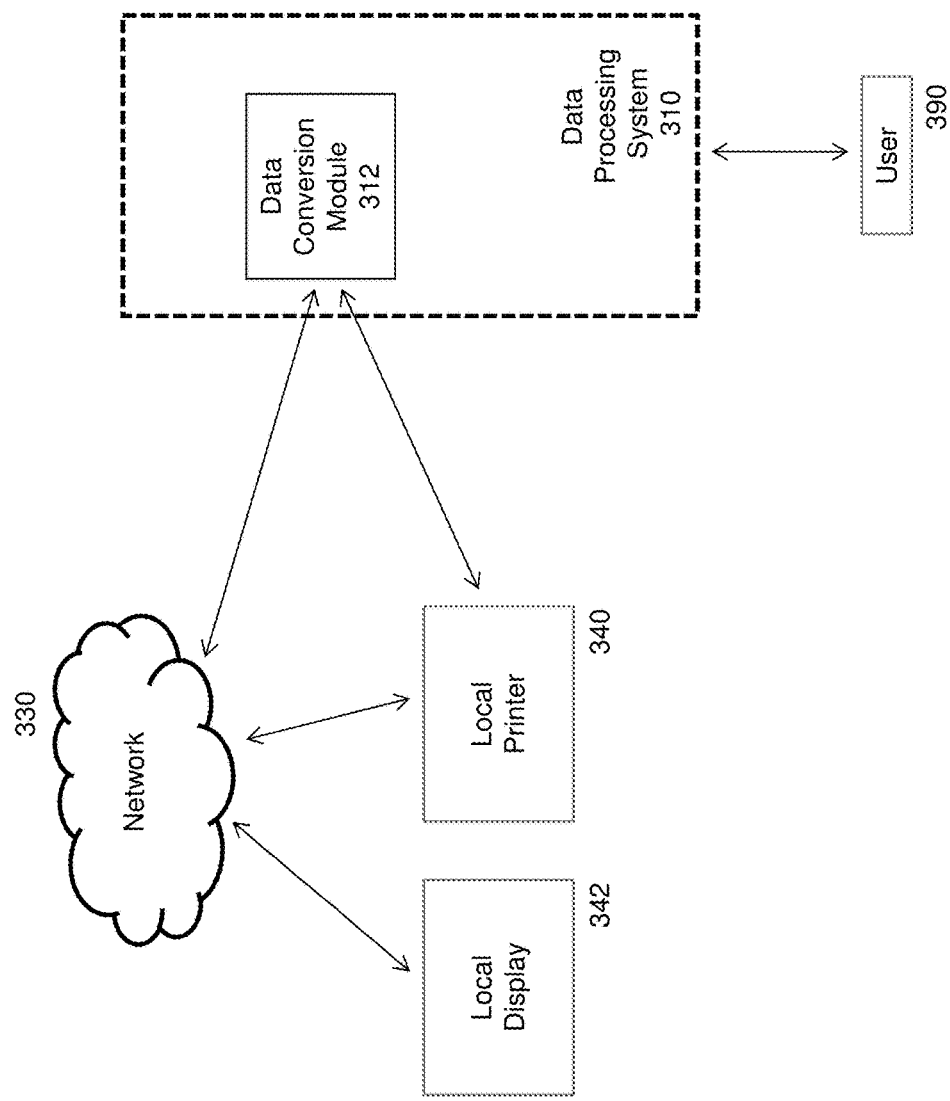
FIG. 3A shows a data processing system communicating with a printer device using a data protocol conversion in accordance with an embodiment.

FIG. 3A shows a data processing system communicating with a printer device using a data protocol conversion in accordance with an embodiment of the present invention.

In the embodiment of FIG. 3A, a data processing system 310 is configured to communicate with a local printer 340. In one embodiment, the local printer 340 is a local extension module 140 shown in FIG. 1 and the data processing system 310 is a data processing system 110 from FIG. 1.

In one embodiment, the communication between the data processing system 310 and the local printer 340 takes place via a wireless network 330 (e.g., a WiFi local wireless network). In an alternative embodiment, the network 330 is a wired network (e.g., an Ethernet LAN). In one embodiment, the communications between the data processing system 310 and the local printer 340 take place over a communication channel, which may be a wired connection (e.g., a wireline connection such as a USB connection) or a wireless connection (e.g., a direct infrared connection, a wireless USB connection, a Bluetooth connection, or any other radio frequency connection).

In one embodiment, the data processing system 310 comprises a data conversion module 312 that is configured to convert regular printing instructions and data into a format that is suitable for direct interpretation by the local printer 340. An advantage of transmitting data from the data processing system 310 to the local printer 340 in a format directly interpretable by the local printer 340 is that a printing transaction can be completed even if the data processing system 310 is not normally configured to transmit print commands or printer data, or to otherwise support a print command (e.g., the operating system or architecture of the data processing system 310 may not support printing instructions). Another advantage of transmitting data from the data processing system 310 to the local printer 340 in a format directly interpretable by the local printer 340 is that a printing transaction can be completed even if, despite the fact that the data processing system 310 may be normally capable of executing a printing command, the printer driver currently installed on the data processing system 310 is not compatible with the local printer 340 or is nonfunctional. Another advantage of transmitting data from the data processing system 310 to the local printer 340 in a format directly interpretable by the local printer 340 is that a printing transaction can be completed while removing additional intermediate data processing modules (e.g., software or hardware drivers) that could provide opportunities for security attacks, could introduce additional risks of malfunction, or could introduce additional delays in the processing of the point of sale transactions. For example, a centralized printer server in a large restaurant of store could become loaded with multiple print requests, therefore possibly slowing down execution of individual printing transactions; this situation could be addressed by transmitting data from individual data processing systems to corresponding printers in formats directly interpretable by the respective printers, in which case the individual transactions may be expedited.

In one embodiment, the data conversion module 312 is not included in the data processing system 310, but is instead a stand-alone module deployed between the data processing system 310 and the local printer 340, mediating data transmissions between the data processing system 310 and the local printer 340 and converting the data transmitted by the data processing system 310 to make it compatible with the local printer 340. In another embodiment, the data conversion module 312 is included in the local printer 340 or in another data processing system or logic module that is in communication with the local printer 340.

In one embodiment, data transmitted by the data processing system 310 is converted into a data stream compliant with a TCP/IP protocol, with the data stream being compatible with printing instructions that are understandable and executable by the local printer 340 either directly or with additional processing. In one embodiment, the data processing system 310 comprises a data processing module (e.g., software instructions) configured to send text messages to the local printer 340 either wirelessly or through a wired connection, with the communications being routed through a TCP data port that translates data into text messages that can be interpreted by the local printer 340.

FIG. 3B shows a data TCP/IP stream that is sent to a printer device to enable it to print information on paper, in accordance with an embodiment of the present invention. In one embodiment, the data processing system 310 sends the TCP/IP packet-level data stream 350 shown in FIG. 3B to the local printer 340 to enable the local printer 340 to directly print corresponding information onto a sheet of paper (e.g., a receipt, a bill, an order confirmation, etc.), and the data sent to the local printer 340 is formatted in an array using a format similar to the data array structure 354 shown in FIG. 3C. In this embodiment, upon receiving packets of data such as the four packets shown in FIG. 3C, the local printer 340 is able to print out characters, symbols or graphics on a suitable medium.

In one embodiment, a local display 342 shown in FIG. 3A is a local extension module 140 shown in FIG. 1 and the data processing system 310 is a data processing system 110 from FIG. 1. In one embodiment, the local display 342 is a display, monitor or other device, data processing system or data processing module that is capable of displaying graphical information. In one embodiment, the local display 342 shows to a retail representative and/or to a customer details regarding the point of sale transaction (e.g., the names, numbers and prices of items being sold in a grocery store). In one embodiment, the local display 342 has limited power or processing resources and/or limited physical output connectivity functionality, and a wireless connection is established between the data processing system 310 from FIG. 3 and the local display 342 to enhance or complement the operational capabilities of the local display 342. In one embodiment, a display that has built-in wireless functionality is connected to the data processing system 310 either directly or indirectly. In one embodiment, a display that has built-in wireless functionality is connected to the data processing system 310 through an assistive data processing module that has wireless transmit and/or receive functionality and can act as an intermediary (this optional intermediary data processing system is not shown in FIG. 3A).

In one embodiment, communications between the local display 342 and the data processing system 310 take place via raw TCP/IP data transmissions that are formatted in a way that enables the respective display to show to a user the information received from the data processing system 310. For example, the data processing system 310 could send a price or information regarding an item to the display via such a TCP/IP connection, and the local display 342 could interpret that data and display the respective price or item information.

In one embodiment, the communication between the data processing system 310 and the local display 342 takes place via a wireless network 330 (e.g., a WiFi local wireless network). In an alternative embodiment, the network 330 is a wired network (e.g., an Ethernet LAN). In one embodiment, the communications between the data processing system 310 and the local printer 340 take place over a communication channel, which may be a wired connection (e.g., a wireline connection such as a USB connection) or a wireless connection (e.g., a direct infrared connection, a wireless USB connection, a Bluetooth connection, or any other radio frequency connection).

In one embodiment, the data processing system 310 comprises a data conversion module 312 that is configured to convert regular display instructions and data into a format that is suitable for direct interpretation by the local display 342. An advantage of transmitting data from the data processing system 310 to the local display 342 in a format directly interpretable by the local display 342 is that display of information can be completed even if the data processing system 310 is not normally configured to transmit display commands, or to otherwise support an external display (e.g., the operating system or architecture of the data processing system 310 may not support rendering graphical information on an external display). Another advantage of transmitting data from the data processing system 310 to the local display 342 in a format directly interpretable by the local display 342 is that display of data on an external monitor can be achieved even if, despite the fact that the data processing system 310 may be normally capable of driving an external display, the display driver currently installed on the data processing system 310 is not compatible with the local display 342 or is nonfunctional. Another advantage of transmitting data from the data processing system 310 to the local display 342 in a format directly interpretable by the local display 342 is that display of data on the external monitor can be completed while removing additional intermediate data processing modules (e.g., software or hardware drivers) that could provide opportunities for security attacks, could introduce additional risks of malfunction, or could introduce additional delays in the processing of the point of sale transactions.

In one embodiment, the data conversion module 312 is not included in the data processing system 310, but is instead a stand-alone module deployed in between the data processing system 310 and the local display 342, mediating data transmissions between the data processing system 310 and the local display 342 and converting the data transmitted by the data processing system 310 to make it compatible with the local display 342. In another embodiment, the data conversion module 312 is included in the local display 342.

In one embodiment, data transmitted by the data processing system 310 is converted into a data stream compliant with a TCP/IP protocol, with the data stream being compatible with printing instructions that are understandable and executable by the local display 342 either directly or with additional processing. In one embodiment, the data processing system 310 comprises a data processing module (e.g., software instructions) configured to send text messages to the local display 342 either wirelessly or through a wired connection, with the communications being routed through a TCP data port that translates data into text messages that can be interpreted by the local display 342.

A TCP/IP datastream such as the TCP/IP datastream shown in FIG. 3B and discussed above in connection with printing to the local printer 340 could also be used, with appropriate modifications, to send graphical data to an external display device to enable it to display the respective graphical data for a user, in accordance with an embodiment of the present invention. In one embodiment, the data processing system 310 sends the TCP/IP packet-level data stream 350 shown in FIG. 3B to the local display 342 to enable the local display 342 to directly display corresponding information on the screen (e.g., a receipt, a bill, an order confirmation, etc.), and the data sent to the local display 342 may be formatted in an array using a format similar to the data array structure 354 shown in FIG. 3C. In one embodiment, upon receiving packets of data such as the four packets shown in FIG. 3C, the local display 342 is able to display to a user corresponding characters, symbols and/or graphics.

In one embodiment, the data processing system 310 is an iPad tablet computer commercialized by Apple Inc. that does not include a connection suitable for driving an external display and/or does not have sufficient power to drive a plurality of peripheral devices via USB or other compatible connections. In that embodiment, the ability to connect the iPad tablet computer to an external display using a wireless TCIP/IP datastream, such as the one described in connection with the embodiments above, could be advantageous.

In one embodiment, the data processing system 310 connects to a bar code scanner using a Bluetooth connection. In one embodiment, the bar code scanner is a local extension module 140 from FIG. 1. In one embodiment, the bar code scanner is a peripheral device 120 from FIG. 1. In one embodiment, the data processing system 310 connects to a bar code scanner using a wireless TOP/IP datastream, such as the one described in connection with the embodiments above.

In one embodiment, another peripheral device, such as a copier, scanner, fax, or any other data processing system or data processing module, is a local extension module 140 shown in FIG. 1 and is deployed instead of, or in addition of the local display 342 or the local printer 340 in FIG. 3A. In this embodiment, such other peripheral device may be configured to communicate with the data processing system 310 using a raw TCP/IP data transmissions that is formatted in a way that enables the respective peripheral device to display, transmit, process or interpret information received from, or transmitted to the data processing system 310. In one embodiment, the TCP/IP data transmissions are formatted in a manner as generally described above in connection with the foregoing two embodiments illustrating TCP/IP data transmissions between the local printer 340 and the data processing system 310, and respectively between the local display 342 and the data processing system 310, subject to additional appropriate modifications to account for the respective functionality of the other peripheral device.

Figure 4A:
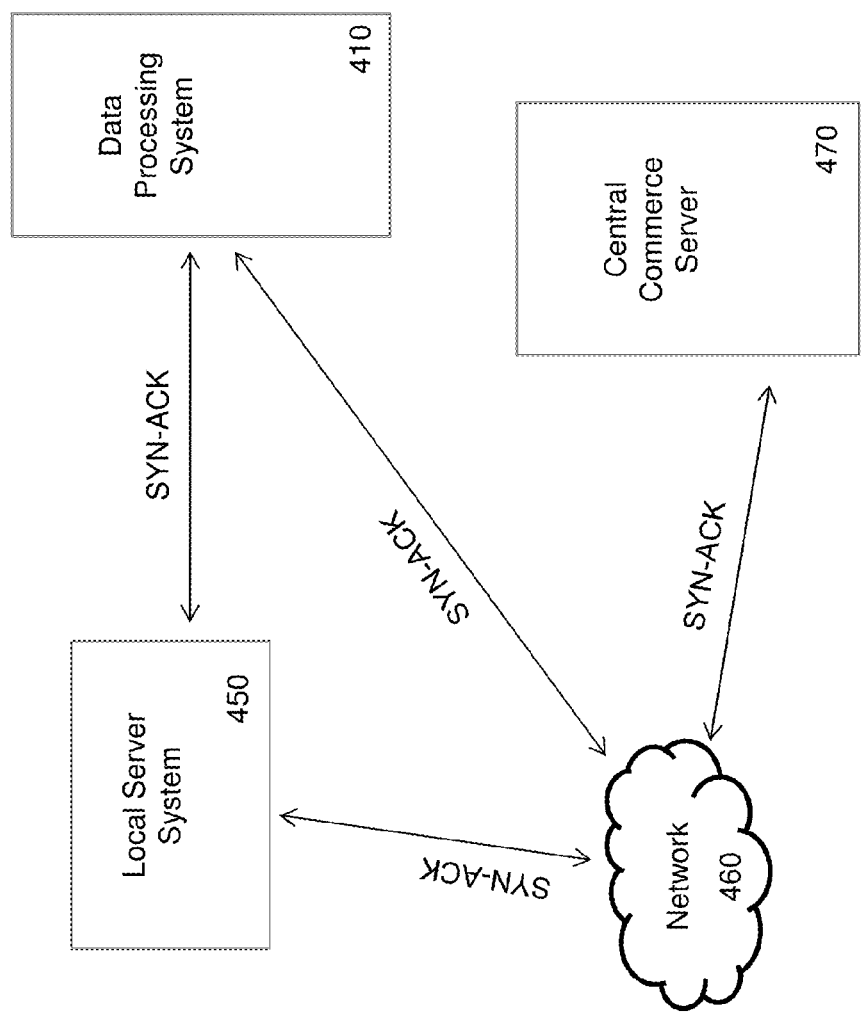
FIG. 4A shows a data processing system communicating with a central server using a security protocol in accordance with an embodiment.

FIG. 4A shows a data processing system communicating with a central server using a security protocol in accordance with an embodiment of the present invention.

Under typical current network architecture deployments, a first computer can establish a three-way TCP/IP handshake with a second computer, and this provides an opportunity for an attacker (e.g., a hacker) to gain unauthorized access to the second computer or to initiate a TCP Denial of Service attack. The second computer normally has at least one communication port open to allow the first computer to initiate such a three-way TCP/IP handshake, and this open port may provide the opportunity for the attacker to obtain such unauthorized access or to cause the Denial of Service attack. Such open ports may exist even in hardware and software systems and modules that are specifically deployed to provide network security functionality, such as firewalls and VPN systems.

To prevent such attacks, various embodiments of the current invention can provide an extra layer of security. In one embodiment, a data processing system deployed in a networking environment is capable of supporting a TCP/IP communication session without presenting an open communication port that could be exploited by an attacker as described in the previous paragraph.

In an exemplary embodiment, the data processing system 410 is configured to establish a TCP/IP communication session with the central commerce sever 470 via network 460 and/or additional communication channels using the following protocol:

(1) the data processing system 410 sends a TCP Synchronize ("SYN") packet to the central commerce sever 470;

(2) the central commerce sever 470 receives the SYN packet;

(3) the central commerce sever 470 sends an acknowledgment ("ACK") packet to the data processing system 410 to signal receipt of the SYN packet;

(4) the data processing system 410 receives the ACK packet from the central commerce sever 470;

(5) the data processing system 410 sends an ACK packet to the central commerce sever 470 to signal receipt of the ACK packet;

(6) the central commerce sever 470 receives the ACK packet;

(7) the data processing system 410 and the central commerce sever 470 then conclude that a TCP/IP socket connection has been successfully established.

Using the security protocol described in this embodiment, an attacker will be deprived by a traditional open port avenue for conducting an attack on a networked computer or server.

In various implementations, the security protocol described in this embodiment could be applied to firewalls, VPN tunnels, HTTPS SSL connections, and other communication transactions between an open port and an application (e.g., an FTP connection).

FIG. 4B shows a communication system protocol and sequence of messages that establishes an open communication channel without relying on open communication ports, in accordance with an embodiment of the present invention.

In the embodiment illustrated in FIG. 4B, a client 490 establishes a communication channel with a server 492 by following a specific security protocol that does not rely on directly accessing a port that was open prior to a mutual handshake compliant with this protocol. The steps of establishing a communication channel using such a security protocol according to an embodiment of the invention are described in FIG. 4B.

In one implementation, a client data processing system (e.g., data processing system 410 from FIG. 4A, client 490 from FIG. 4B) sends four packets of data to a server data processing system (e.g., server 492 from FIG. 4B). In this implementation, the server does not respond to these four packets, but checks that the four packets satisfy specific criteria (e.g., a particular packet was sent to a specific port, a particular packet has a specific payload characteristic, some or all packets follow an expected order, size and time pattern, etc.). If the server concludes that the applicable criteria were met, the server then attempts to located an encrypted AES hash in the payload of one or more TCP packets, and if it finds the correct hash, the server then opens a TCP/IP port to which the client can then connect to initiate a communication session. The server and the client may then exchange a certificate request and engage in an authentication process, and if successfully completed, the server may grant access to the client to actually establish the communication session, so that data transmissions can take place between the client and the server.

In one embodiment, a client has a list of access codes. In one implementation, if a code is selected, it cannot be used again. In one implementation, the server also maintains a list of codes for each client computer and uses it to authenticate the clients.

In one embodiment, a client uses codes which are a TCP size of a packet in a SYN packet and a port number. Once packets are sent in correct order (e.g., three successive packets), then one or more packets may be sent to establish a timing pattern (e.g., a specific delay or pattern of delays between two or more packets sent). The timing pattern may change each time a packet is sent. For example, the following sequence of packets and communications could be used to establish an authenticated session between a client and a server:

(1) the client sends a first packet with a length of 58 bytes to server port 500;

(2) the server verifies that the expected length of a packet was 58 and was received at server port 500; at this point, the server may start to actively listen for additional packets that follow a pre-established set of characteristics;

(3) the client sends the second packet with a length of 78 bytes to server port 800;

(4) the client sends the third packet with a length of 893 bytes to server port 20000;

(5) the client sends the fourth packet with a length of 1245 bytes (which may be a numeric code of a particular time of day), after a delay of 150 milliseconds, to server port 5000;

(6) the server verifies that the lengths of the second, third and fourth packets were as expected (e.g., for the description above, the exemplary values would be 78, 893 and 1245), that the delay pattern between the packets was also as expected (e.g., for the description above, the exemplary values would be 150 milliseconds between the send times of the third and fourth packets), and that the ports at which each packet was received were indeed as expected (e.g., for the description above, the exemplary values would be ports 800, 20000 and 5000). If these characteristics are met by the incoming packets, the server may be prepared to open a communication channel with the client and establish an encrypted connection and/or communicate substantive data.

In one implementation, if the sequence of packets used to authenticate a client includes a code for a date or a time, the algorithm that implements that code may be modified at any time (e.g., when software is updated or new software is installed on the server, the algorithm may modify automatically using a predefined set of rules, etc.). In one embodiment, as an algorithm used to define the rules for authenticating communication sessions changes, the set of rules used to determine the encryption framework (e.g., the structure and/or payload of one or more packets carrying encryption keys, content and/or encryption-algorithm data) may also change.

To increase the efficiency of an authentication algorithm in accordance with an embodiment, a server could use the size of the packets received from a client to avoid processing too much data, the server could implement only subsets of a broader authentication algorithm. For example, in one implementation a server could process only the last packet in a sequence of incoming packets, and may do that only if a certain set of earlier packets satisfied specific criteria (e.g., only if the first three packets received matched applicable criteria in terms of length of payload, content of payload, delay pattern, and/or other applicable criteria). In such an implementation, if the packet in the sequence that is processed by the server carries the expected hash function in the payload (e.g., the hash function is the correct AES 256 encrypted hash), then the client is granted access, and the server and the respective client establish an encrypted tunnel channel. In that case, the client could then provide a certificate to verify the client is indeed part of the authorized network. If the certificate is correct, the client may receive access to the server content and/or may be accepted to conduct communications or other transactions with the server. If the certificate is not correct, the tunnel and access may close within a short period of time (e.g., one second). Closing the tunnel promptly in the event of any unexpected communication or unexpected behavior of a client decreases the probability of a successful attack if a user were able to break or guess the authentication algorithm.

In one embodiment, the security protocol could utilize other approaches, whether instead or in addition to the algorithms described in connection with the foregoing embodiments, such as simply sending the size of packets to a port on the server with a time packet for the last packet just so that the sequence could not be replayed, or could avoid using the time criteria if a code is used only once.

In one embodiment, once a client has been authenticated by the server, the client is allowed to communicate to the server. Until then, the server does not send any data packets back to the client and the server appears virtually invisible to the client.

In various implementations, the security protocols described in the embodiments above could be applied to other packet-based communication protocols beyond TCP, such as, for example, AH Authentication Header over IP or IPSec, ESP Encapsulating Security Payload over IP or IPSec, GRE Generic Routing Encapsulation for tunneling, IL Originally developed as transport layer for 9P, SCTP Stream Control Transmission Protocol, Sinec H1 for telecontrol, SPX Sequenced Packet Exchange, and UDP User Datagram Protocol.

Using a security protocol similar to the one described in the embodiments above, a server may be virtually invisible to potential network attackers because the server may maintain ports closed until a client computer successfully validates a predetermined authentication method (e.g., until a client sends a predetermined number of data packets (e.g., SYN packets) with the correct payloads). With a server virtually invisible, the ability of a hacker or attacker to obtain unauthorized access to the server or to flood the server with communications in a denial of service attack is correspondingly limited.

Figure 5A:
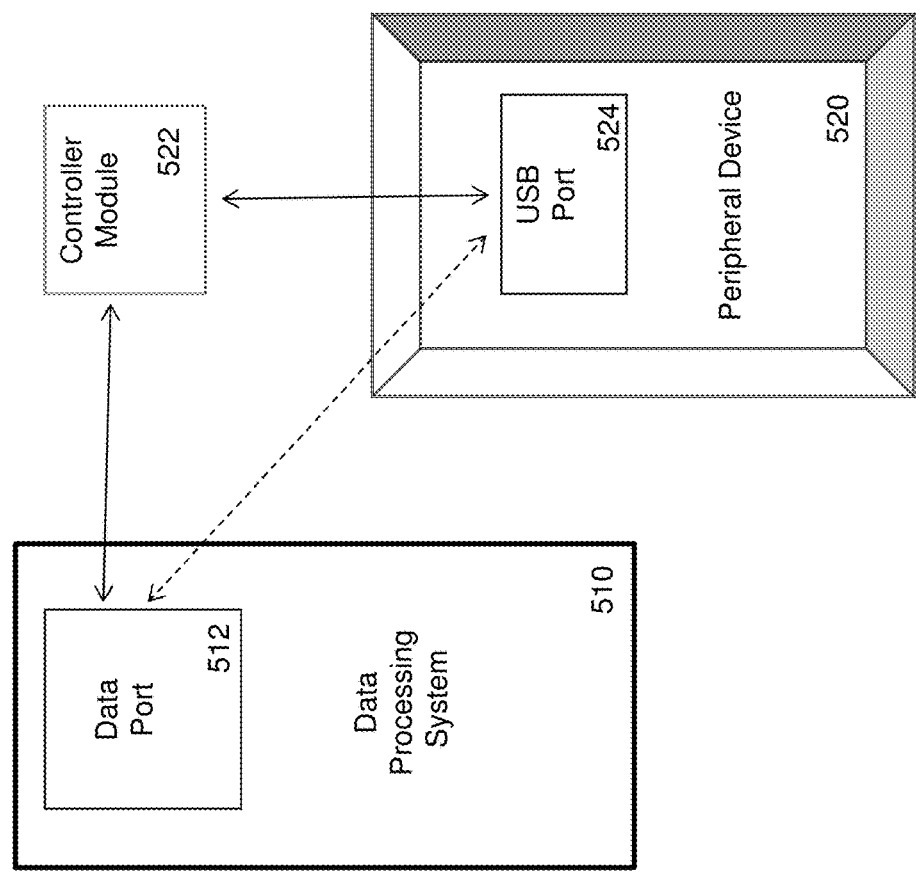
FIG. 5A shows a peripheral device communicating with a data processing system using data converted from a USB data protocol to a serial data protocol in accordance with an embodiment.

FIG. 5A shows a peripheral device communicating with a data processing system using data converted from a USB data protocol to a serial data protocol in accordance with an embodiment.

In the embodiment of FIG. 5A, a peripheral device 520 communicates with a data processing system 510. In one embodiment, the peripheral device 520 is the peripheral device 120 from the embodiment of FIG. 1. In one embodiment, the data processing system 510 is the data processing system 110 from FIG. 1.

In one embodiment, data transmissions between the peripheral device 520 and the data processing system 510 take place directly, through a direct communication channel. In one embodiment, data transmissions between the peripheral device 520 and the data processing system 510 are routed through a controller module 522, which facilitates conversion of data from a first data protocol to a second data protocol. In one implementation, the first data protocol is a USB protocol, and the second data protocol is a serial data protocol.

In the embodiment of FIG. 5A, the peripheral device 520 comprises a USB port 524, which is configured to transmit and receive data formatted in accordance with a USB protocol. The data processing system 510 shown in the embodiment of FIG. 5A comprises a data port 512, which is configured to transmit and receive data in accordance with a data protocol that is not a USB protocol. In one implementation, the data port 512 operates using a serial data protocol. In one embodiment, the data port 512 is the data port 112 from the embodiment of FIG. 1.

Figure 5B:
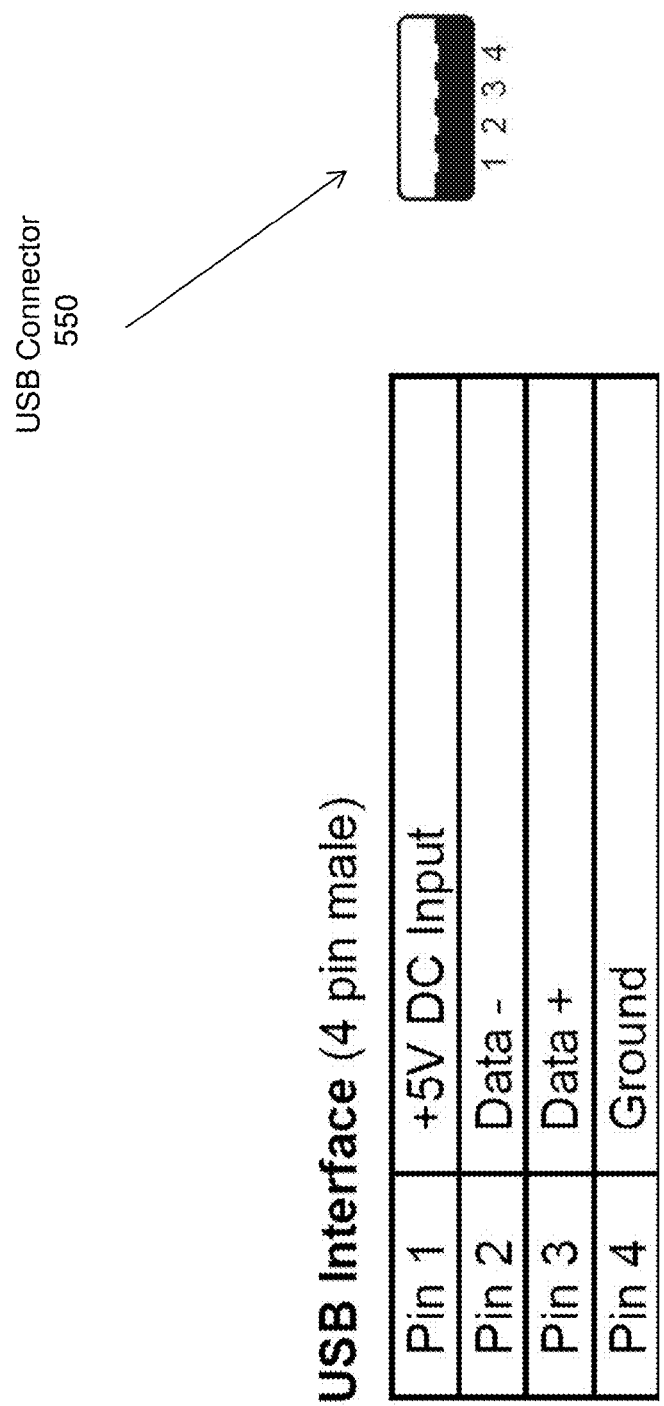
FIG. 5B shows a USB connector that is suitable for connecting a peripheral device to a data processing system using data converted from a USB data protocol to a serial data protocol in accordance with an embodiment.

FIG. 5B shows a USB connector that is suitable for connecting a peripheral device to a data processing system using data converted from a USB data protocol to a serial data protocol in accordance with an embodiment of the present invention.

In one embodiment, cables connecting to the four pins of the USB connector 550 shown in FIG. 5B are separated (e.g., by cutting a cable attached to the USB connector 550) into two data cables, a power cable and a ground cable. The power and the ground are separated into a separate power source and are fed power from an external power unit. These cables can then be connected to a peripheral device (e.g., a card swipe unit) to power the peripheral device without drawings power from a data processing system such as the data processing system 510 from FIG. 5A (e.g., to avoid overstressing or drawing too much power from the respective data processing system).

In one embodiment, the remaining two data cables are then coupled to a corresponding data processing system (e.g., the data processing system 510 from FIG. 5A) to conduct data communications.

In one embodiment, the two USB data cables are connected to a 30-pin connector that is adapted to conduct serial data transmissions and is compatible with a connector of an iPad tablet computer currently commercialized by Apple Inc. A pin structure for such a connector in accordance with an embodiment is shown in Table 1 below. In one implementation, the two data cables from the USB connector discussed above are connected to pins 25 and 27 from Table 1, and pins 18 and 23 are used for power, and pin 21 is used to identify a particular type of connection to the iPad device.

TABLE 1

Connector Pin Structure in Accordance with An Embodiment

| Pin | Signal | Description |
| --- | --- | --- |
| 1 | GND | Ground (−), internally connected with Pin 2 on iPod motherboard |
| 2 | GND | Audio and Video ground (−), internally connected with Pin 2 on iPod motherboard |
| 3 | Right | Line Out-R (+) (Audio output, right channel) |
| 4 | Left | Line Out-L (+) (Audio output, left channel) |
| 5 | Right In | Line In-R (+) |
| 6 | Left In | Line In-L (+) |
| 8 | Video Out | Composite video output (only when the slideshow mode is active on iPod Photo) |
| 9 | S-Video Chrominance output | For iPod Color, Photo only |
| 10 | S-Video Luminance output | For iPod Color, Photo only |
| 11 | GND | Serial GND |
| 12 | Tx | iPod sending line, Serial TxD |
| 13 | Rx | iPod receiving line, Serial RxD |
| 14 | NC | |
| 15 | GND | Ground (−), internally connected with pin 16 on iPod motherboard |
| 16 | GND | USB GND (−), internally connected with pin 15 on iPod motherboard |
| 17 | NC | |
| 18 | 3.3 V | 3.3 V Power (+) Stepped up to provide +5 VDC to USB on iPod Camera Connector. If iPod is put to sleep while Camera Connector is present, +5 VDC at this pin slowly drains back to 0 VDC. |
| 19, 20 | +12 V | Firewire Power 12 VDC (+) |
| 21 | Accessory Indicator/ Serial enable | In one embodiment, different resistances indicate accessory type as follows: 1 KOhm-iPod docking station, beeps when connected 10 KOhm-Takes some iPods into photo import mode 68 kOhm-makes iPhone 3g send audio through line-out without any messages 500 KOhm-related to serial communication/used to enable serial communications Used in Dension Ice Link Plus car interface 1 MOhm-Belkin auto adaptor, iPod shuts down automatically when power disconnected Connecting pin 21 to ground with a 1 MOhm resistor does stop the iPod when power (i.e. Firewire-12 V) is cut. |
| 22 | TPA (−) | FireWire Data TPA (−) |
| 23 | 5 VDC (+) | USB Power 5 VDC (+) |
| 24 | TPA (+) | FireWire Data TPA (+) |
| 25 | Data (−) | USB Data (−) |
| 26 | TPB (−) | FireWire Data TPB (−) |
| 27 | Data (+) | USB Data (+) Pins 25 and 27 may be used in different manner. To force the iPod to charge in any case, when 'USB Power 5 VDC' (pin 23) is fed, 25 must be connected to 5 V through a 10 KOhm resistor, and 27 must be connected to the Ground (for example: pin 1) with a 10 KOhm resistor. |
| 28 | TPB (+) | FireWire Data TPB (+) |
| 29, 30 | GND | FireWire Ground (−) |

Figure 6:
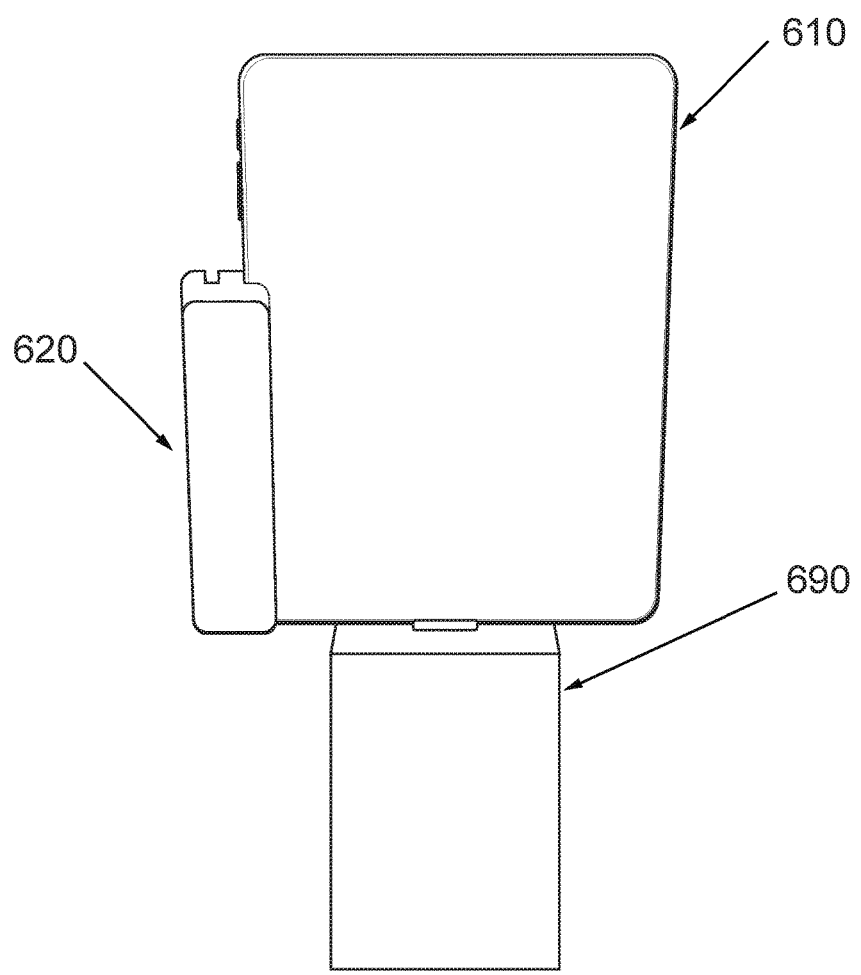
FIG. 6 shows an exemplary configuration for a data processing system deployed to facilitate point of sale transactions in accordance with an embodiment.

FIG. 6 shows an exemplary configuration for a data processing system deployed to facilitate point of sale transactions in accordance with an embodiment. In the embodiment of FIG. 6, a tablet computer 610 (illustrated as an iPad tablet computer currently commercialized by Apple Inc.) is locked to a docking station. In one embodiment, the tablet computer 610 is the data processing system 110 from FIG. 1. The tablet computer 610 shown in FIG. 6 is locked to a docking station 690 and has a card reader module 620 (e.g., a device adapted to read credit cards or accept other forms of payment) attached to it. In one embodiment, the card reader module 620 is the peripheral device 120 from the embodiment of FIG. 1. The tablet computer 610 may slide out and be used as a portable unit to conduct point of sale transactions, or may stay locked into the base station 690 and conduct point of sale transactions as a stationary unit. In one embodiment, the base station 690 shown in FIG. 6 may also house a printer or other extension module device. In one embodiment, such printer or other extension module device is the local extension module 140 from the embodiment of FIG. 1. Such printer or other extension module device may be wired or wireless, depending on the needs of the entity conducting the respective point of sale transactions. A cash drawer, such as the cash drawer 892 shown in FIG. 8, may be disposed below the tablet computer 610, and the cash drawer may be secured (e.g., bolted) to the case of the printer unit to enhance security.

Figure 7:
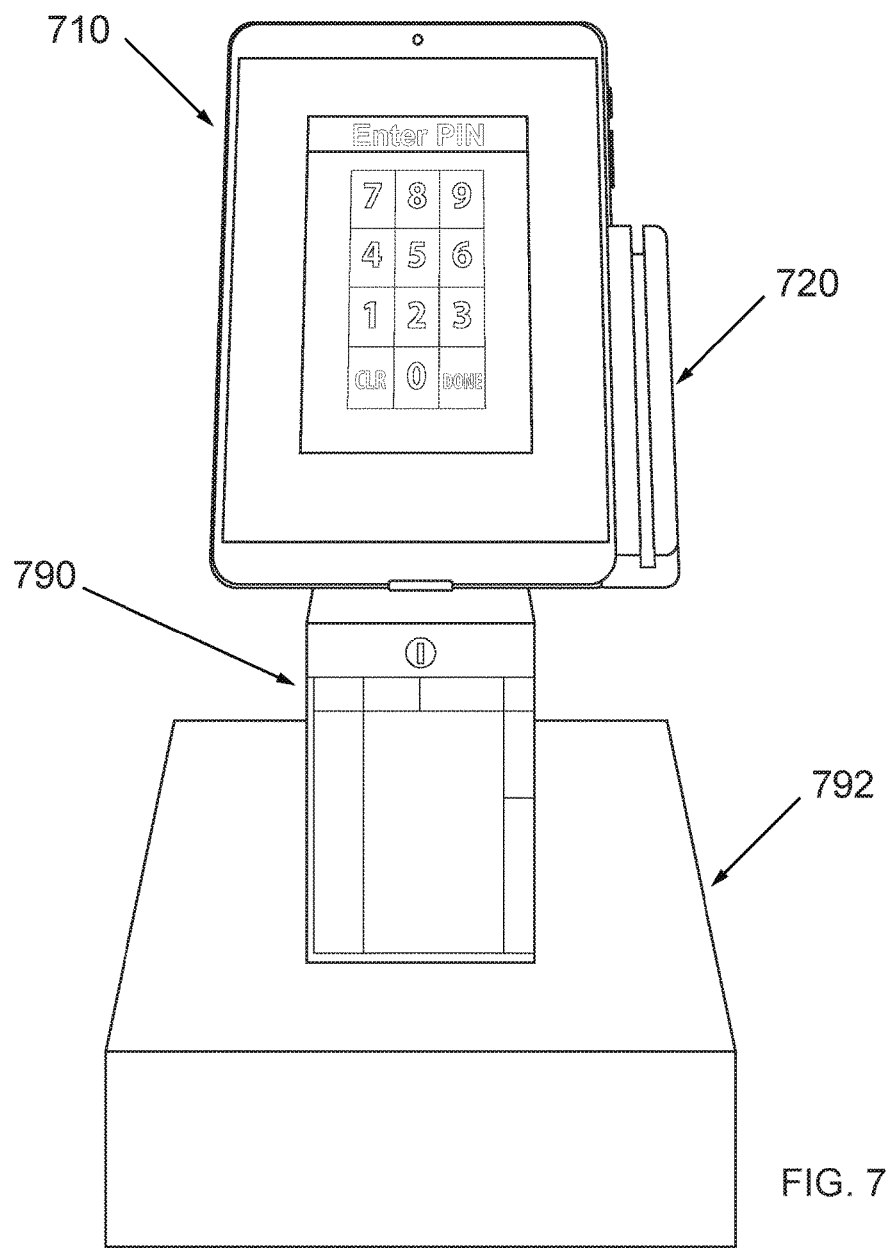
FIG. 7 shows another exemplary configuration for a data processing system deployed to facilitate point of sale transactions in accordance with an embodiment.
Figure 8:
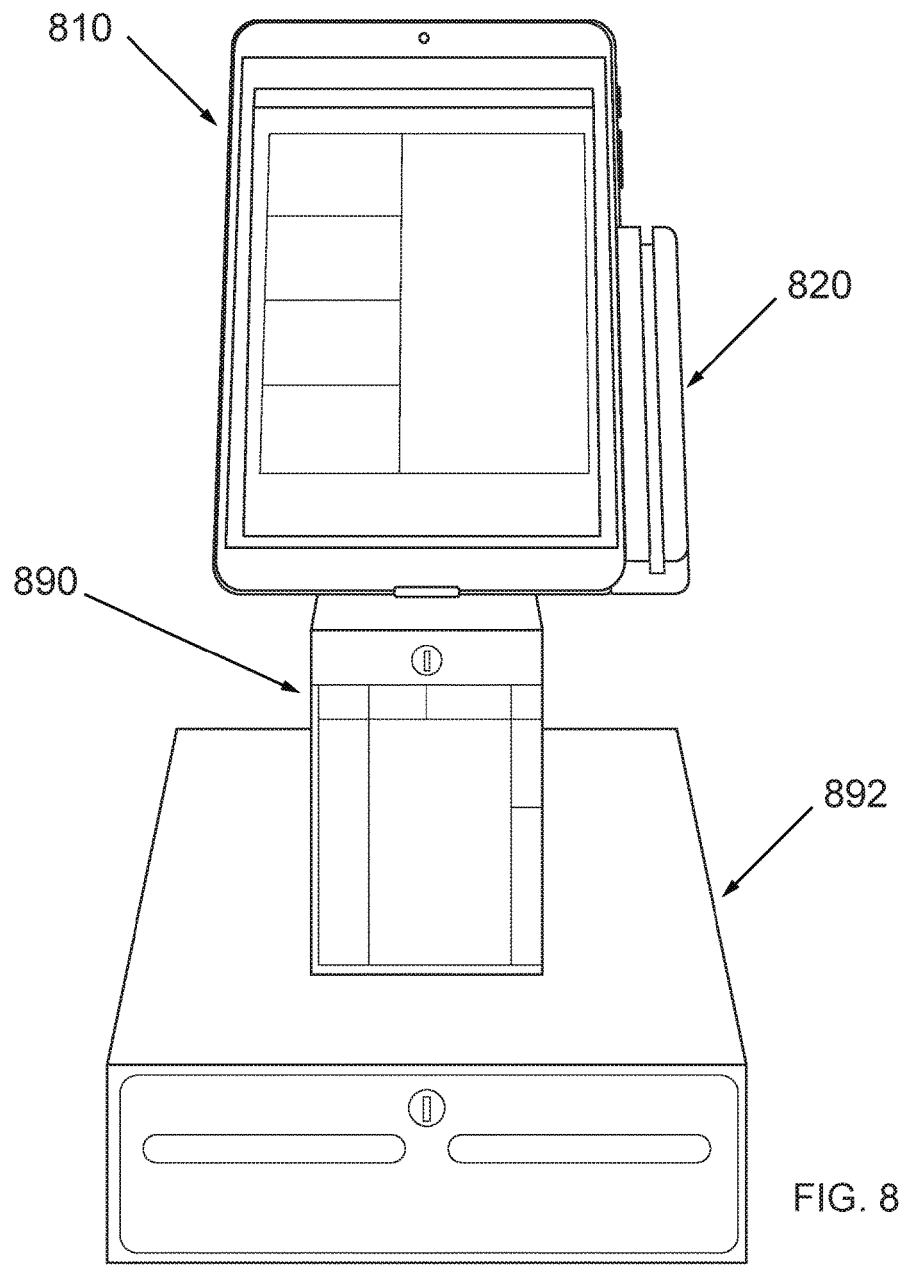
FIG. 8 shows another exemplary configuration for a data processing system deployed to facilitate point of sale transactions in accordance with an embodiment.

FIG. 7 shows another exemplary configuration for a data processing system deployed to facilitate point of sale transactions in accordance with an embodiment of the present invention. As shown in FIG. 7, a tablet computer 710 (illustrated as an iPad tablet computer currently commercialized by Apple Inc.) is attached to a card reader module 720 and to a docking station 790. The docking station 790 is attached to a cash drawer 792. The configuration of the system shown in FIG. 7 is similar to that of the system shown in FIG. 6, with the system shown in FIG. 7 also including the cash drawer 792.

FIG. 8 shows another exemplary configuration for a data processing system deployed to facilitate point of sale transactions in accordance with an embodiment of the present invention. As shown in FIG. 8, a tablet computer 810 (illustrated as an iPad tablet computer currently commercialized by Apple Inc.) is attached to a card reader module 820 and to a docking station 890. The docking station 890 is attached to a cash drawer 892. The configuration of the system shown in FIG. 8 is similar to that of the system shown in FIG. 7.

Figure 9:
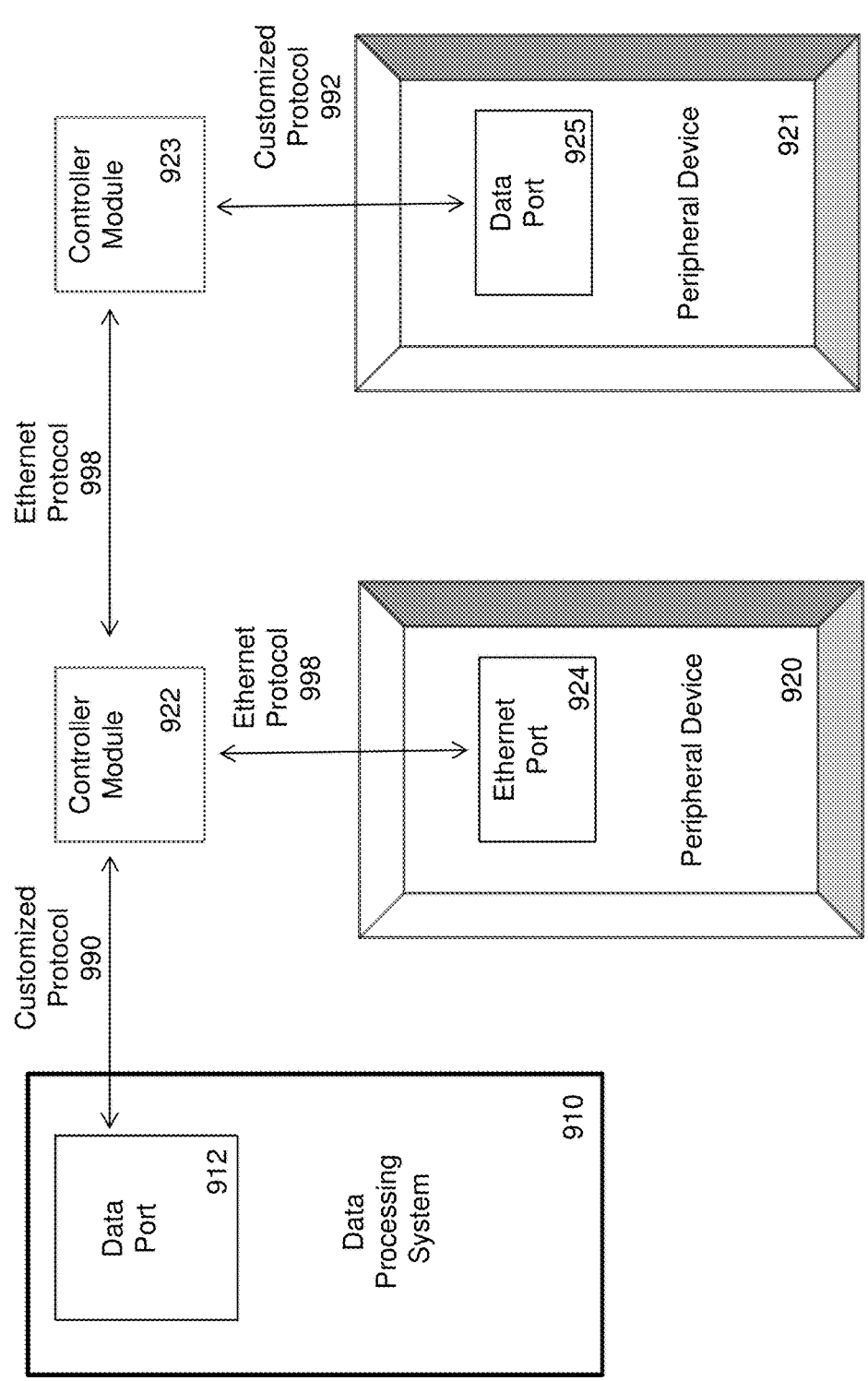
FIG. 9 illustrates one or more peripheral devices communicating with a data processing system using data converted between customized data protocols and a standardized communication protocol in accordance with an embodiment.

FIG. 9 illustrates one or more peripheral devices communicating with a data processing system using data converted between customized data protocols and a standardized communication protocol in accordance with an embodiment.

In the embodiment of FIG. 9, a peripheral device 920 communicates with a data processing system 910. In one embodiment, the peripheral device 920 is the peripheral device 120 from the embodiment of FIG. 1. In one embodiment, the data processing system 910 is the data processing system 110 from FIG. 1.

In the embodiment of FIG. 9, a second peripheral device 921 communicates with the data processing system 910. In one embodiment, the peripheral device 921 is the peripheral device 120 from the embodiment of FIG. 1.

The two peripheral devices 920 and 921 are shown in FIG. 9 for illustration purposes, to exemplify various embodiments, but either of the two devices 920 and 921 may be omitted. Analogously, in various embodiments, additional devices that are similar to the devices 920 and 921 may be connected to the data processing system 910. In one embodiment, there may be multiple data processing systems similar to the data processing system 910 and devices that are similar to the devices 920 and 921.

In one embodiment, data transmissions between the peripheral device 920 and the data processing system 910 take place directly, through a direct communication channel.

In one embodiment, data transmissions between the peripheral device 920 and the data processing system 910 are routed through a controller module 922, which facilitates conversion of data from a first data protocol to an intermediate data protocol.

In one embodiment, the first data protocol is a customized protocol that can be directly processed by the data processing system 910, which is denoted in FIG. 9 as the customized protocol 990. In one embodiment, the customized protocol 990 is a protocol that may be processed through a connector that is implemented on an iPad tablet device commercialized by Apple Computer, Inc. In various embodiments, the customized protocol 990 may be any serial, parallel, or packet-based communication protocol that can be used by a data processing system or logic module to transmit or receive information.

In one embodiment, the intermediate data protocol is a communication protocol that is in widespread use in the industry, such as any communication protocol (whether low level, high level, backbone or otherwise) used in any communication channel or data network, including LANs, MANs, WANs, cellular and mobile telephony networks, the Internet or the World Wide Web. In the embodiment of FIG. 9, the intermediate data protocol is shown to be an Ethernet protocol and is denoted Ethernet protocol 998.

Advantages for using an intermediate data protocol that is standardized or is designed for longer distance communications include decreased costs, availability of standardized interface modules, availability of preinstalled cabling and communication lines, increased reliability for data communications, better ability to track and address communication errors, and others.

In one embodiment, the controller module 922 is a Serial-to-Ethernet (S2E) Module model MDL-S2E commercialized by Texas Instruments. One application for the MDL-S2E module that is specified by Texas Instruments is to facilitate Ethernet communications for devices that lack built-in Ethernet connectivity but have a UART or RS-232 port. In various embodiments, a conversion module such as this S2E module may be adapted to convert data from a first communication protocol used by the data processing system 910 to an intermediate widely used communication protocol, denoted in FIG. 9 as Ethernet protocol 998.

In various embodiments, the controller module 922 may be integrated within the data processing system 910, may be attached or otherwise connected to the data processing system 910, or may be deployed remotely (alone or integrated in a data processing system or logic module) such that communications from the data processing system 910 and intended for the peripheral device 920 and/or peripheral device 921 are routed through the controller module 922.

In the embodiment of FIG. 9, the peripheral device 920 comprises a data port that is configured to transmit and receive data formatted in accordance with the intermediate data protocol. For the embodiment of FIG. 9, the second data protocol is illustrated as the Ethernet protocol 998, so the data port shown as incorporated within the peripheral device 920 is an Ethernet port, denoted as Ethernet port 924. In one embodiment, the Ethernet port 924 is not incorporated in the peripheral device 920, but may be attached or otherwise connected to the data peripheral device 920, or may be deployed remotely (alone or integrated in a data processing system or logic module) such that communications from the controller module 922 and intended for the peripheral device 920 are routed through the Ethernet port 920.

In one embodiment, the peripheral device 921 is similar to the peripheral device 920, but does not comprise an Ethernet port. Instead, the peripheral device 921 comprises a data port that communicates using a customized protocol, not directly compatible with more widely used communication protocols, such as the Ethernet protocol 998 shown in FIG. 9. Consequently, communications formatted in accordance with the Ethernet protocol 998 are routed through a controller module 923. In one embodiment, the controller module 923 is incorporated in the peripheral device 921. In one embodiment, the controller module 923 is not incorporated in the peripheral device 921, but may be attached or otherwise connected to the data peripheral device 921, or may be deployed remotely (alone or integrated in a data processing system or logic module) such that communications from the controller module 922, from the data processing system 910, and or from other data processing systems or data processing modules and intended for the peripheral device 921 are routed through the controller module 923.

In one embodiment, the controller module 922 converts a first customized data protocol to an intermediate protocol that is a TCP/IP protocol compatible with an Ethernet data communication, and the controller module 923 converts an intermediate protocol that is a TCP/IP protocol compatible with an Ethernet data communication to a second customized data protocol. In one embodiment, the first and second customized data protocols are the same, or are compatible with each other. In one embodiment, the first and second customized data protocols are different and are not directly compatible with each other.

In one embodiment, the data port 925 of the peripheral device 921 is compatible with a 9-pin DB9 (sometimes denoted DE9) connector. In one embodiment, a cable that connects the controller module 923 to the data port 925 has DB9 connectors at both ends. In one embodiment, a cable that connects the controller module 923 to the data port 925 has an Ethernet connector at the end of the controller module 923 and a DB9 connector at the end of the data port 925. In one embodiment, the controller module 923 is powered through a pin of the cable that attaches the controller module 923 to the peripheral device 921, with the peripheral device 921 supplying the power for the controller module 923 to operate.

In one embodiment, the data port 912 of the data processing system 910 is an iPad (or other electronic tablet) data connector. In one embodiment, a cable that connects the controller module 922 to the data port 912 has iPad (or other electronic tablet) connectors at both ends. In one embodiment, a cable that connects the controller module 922 to the data port 912 has an Ethernet connector at the end of the controller module 922 and an iPad (or other electronic tablet) data connector at the end of the data processing system 910. In one embodiment, the controller module 922 is powered through a pin of the cable that attaches the controller module 922 to the data processing system 910, with the data processing system 910 supplying the power for the controller module 922 to operate.

In one embodiment, the data processing system 910 transmits or receives specific operational instructions or data communications to or from the peripheral device 921. If the customized protocols 990 and 992 are not directly compatible, the controller module 922 converts data formatted in accordance with the customized protocol 990 into an intermediate protocol (e.g., the Ethernet protocol 998), and the controller module 923 converts data formatted in accordance with the intermediate protocol (e.g., the Ethernet protocol 998) into data formatted in accordance with the customized protocol 992.

In one embodiment, the peripheral device 921 may be programmed to interpret the operational instructions or data communications sent by the data processing system 910, and to transmit instructions and data to the data processing system 910. In one embodiment, the peripheral device 921 includes an application programming interface (API) or is compatible with an API that permits the peripheral device 921 to be programmed to interpret the operational instructions or data communications received from the data processing system 910, and to transmit instructions and data to the data processing system 910.

In one embodiment, the peripheral device 921 is a coin dispenser that is in communications with an iPad tablet deployed as the data processing system 910. The coin dispenser may be configured to release coins to customers in a POS retail environment (e.g. to provide change in a grocery store). The coin dispenser may receive specific instructions from the iPad tablet to dispense various combinations of coins, and the coin dispenser may communicate back to the iPad tablet various data regarding its status (e.g., indicating that a certain type of coins are being depleted, acknowledging successful coin dispensing operations, etc.).

FIG. 10 shows an exemplary set of instructions that may be used by a data processing system to communicate with a peripheral device using a customized data protocol in accordance with an embodiment.

The data transmitted in accordance with the protocol illustrated in FIG. 10 is formatted in a hexadecimal equivalent of ASCII digits. For example, a '0' as data may be formatted as '0x30' and a '9' would be formatted as '0x39'.

For the protocol illustrated in FIG. 10, certain instructions to the coin dispenser deployed as peripheral device 921 may follow specific rules, such as the following:

'Busy Flag Bit' (Stat1 Bit 3) is SET during dispense.
'Coin Dispensed Bit' (Stat1 Bit 5) is SET after a successful dispense cycle.
'Reset Machine Status' command is set before a 'Dispense' command to CLEAR the 'Coin Dispensed Bit' (Stat1 Bit 5).

In various embodiments, instructions and data formatted in accordance with the protocol illustrated in FIG. 10 are sent between the data processing system 910 and the peripheral device 921 using an intermediate communication protocol that is an Ethernet protocol (or any other standardized or more widely used data protocol) performed through the controller module 922 and the controller module 923. In various embodiments, the peripheral device 921 is programmed to interpret instructions and data formatted in accordance with the protocol illustrated in FIG. 10 and to perform various functions (e.g. a coin dispenser may perform coin dispensing functions and communicated back status information, a scale may perform measurements and communicate back values measured, etc.). In general, the peripheral device 921 may be any device that facilitates a commercial transaction at a POS and may be programmed to execute virtually any of its functions by appropriately interpreting instructions sent by the data processing system 910.

This specification describes in detail various embodiments and implementations of the present invention, and the present invention is open to additional embodiments and implementations, further modifications, and alternative and/or complementary constructions. There is no intention in this patent to limit the invention to the particular embodiments and implementations disclosed; on the contrary, this patent is intended to cover all modifications, equivalents and alternative embodiments and implementations that fall within the scope of the claims.

As used in this specification, a set means any group of one, two or more items. Analogously, a subset means, with respect to a set of N items, any group of such items consisting of N−1 or less of the respective N items.

As used in this specification, the terms "include," "including," "for example," "exemplary," "e.g.," and variations thereof, are not intended to be terms of limitation, but rather are intended to be followed by the words "without limitation" or by words with a similar meaning. Definitions in this specification, and all headers, titles and subtitles, are intended to be descriptive and illustrative with the goal of facilitating comprehension, but are not intended to be limiting with respect to the scope of the inventions as recited in the claims. Each such definition is intended to also capture additional equivalent items, technologies or terms that would be known or would become known to a person of average skill in this art as equivalent or otherwise interchangeable with the respective item, technology or term so defined. Unless otherwise required by the context, the verb "may" or "could" indicates a possibility that the respective action, step or implementation may or could be achieved, but is not intended to establish a requirement that such action, step or implementation must occur, or that the respective action, step or implementation must be achieved in the exact manner described.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A point-of-sale (POS) electronic system for conducting a commercial transaction, the POS electronic system comprising:
    a data processing system comprising a terminal, a peripheral device that facilitates input of customer-related data indicating a payment request by a customer for the commercial transaction, and at least one data port that receives the customer-related data indicating the payment request from the peripheral device and that transmits at least a portion of the customer-related data to a central commerce system; and
    central commerce system communicatively coupled to the data processing system that establishes an authenticated session with the data processing system and that receives the at least a portion of the customer-related data indicating a payment request and directly approves or declines the payment request by the customer without interfacing with an external financial institution,
    wherein the central commerce system establishes the authenticated session with the data processing system by performing the steps comprising:
    receiving a sequence of communications from the data processing system;
    determining whether the sequence of communications satisfies a preset pattern,
    responsive to the set of communications satisfying the preset pattern, establishing an authenticated session with the data processing system; and
    responsive to the set of communications not satisfying the preset pattern, not responding to any of the set of communications, and wherein the preset pattern comprises:
        receiving at a first port a first packet having a first size;
        receiving, within a first time period after receiving the first packet, at a second port a second packet having a second size;
        receiving, within a second time period after receiving the first packet, at a third port a third packet having a third size; and
        receiving, within a third time period after receiving the first packet, at a fourth port a fourth packet having a fourth size.

2. The point-of-sale (POS) electronic system of claim 1 wherein the preset pattern further comprises one or more criteria comprising:
    a particular packet from the series of packets was sent to a specific port;
    a certain number of packets from the series of packets were sent to a specific port or specific ports;
    a particular packet has a specific payload characteristic;
    a certain number of packets from the series of packets have a specific payload characteristic or characteristics;
    at least some of the packets from the series of packets follow an expected order;
    at least some of the packets from the series of packets have an expected size or sizes;
    at least some of the packets from the series of packets follow an expected timing;
a particular packet has a specific payload; and
    a certain number of packets from the series of packets have a specific payload or specific payloads.

3. The point-of-sale (POS) electronic system of claim 1 wherein the preset pattern further comprises:
    including a specific payload in at least one of the first, second, third, or fourth packets.

4. The point-of-sale (POS) electronic system of claim 1 wherein the sequence of communications comprises a set of packets and the step of determining whether the sequence of communications satisfies a preset pattern comprises:
    verifying that each packet in the set of packets was received at a specific port and within a specific timing window according to the preset pattern; and
    verifying that a payload of at least one of the packet contained expected information according to the preset pattern.

5. The point-of-sale (POS) electronic system of claim 4 wherein the step of verifying that a payload of at least one of the packet contained expected information according to the preset pattern comprises:
    determining that a packet in the set of packets comprises an expected hash value in its payload.

6. The point-of-sale (POS) electronic system of claim 5 further comprising:
    responsive to establishing a communication session with the data processing system, receiving from the data processing system a certificate; and
    responsive to verifying the certificate, allowing the data processing system to interact with the central commerce system.

7. A computer-implemented method for facilitating secure network connecting, the method comprising:
    receiving, at a first computing device, a series of packets of data originating from a second computing device;
    determining whether the series of packets of data satisfy a specific set of criteria; responsive to determining that the series of packets of data satisfy as specific set of criteria, attempting to establish a communication session with the second computing device;

responsive to determining that the series of packets of data do satisfy a specific set of criteria, not establishing a communication session with the second computing device;

responsive to establish a communication session with the second computing device, receiving from the second computing device a certificate; and responsive to verifying the certificate, allowing the second computing device access to content on the first computing device.

8. The computer-implemented method of claim 7 further comprising:

not responding to any individual packet in the series of packets of data.

9. The computer-implemented method of claim 7 wherein the specific set of criteria comprises one or more criteria comprising:

a particular packet from the series of packets was sent to a specific port;

a certain number of packets from the series of packets were sent to a specific port or specific ports;

a particular packet has a specific payload characteristic;

a certain number of packets from the series of packets have a specific payload characteristic or characteristics;

at least some of the packets from the series of packets follow an expected order;

at least some of the packets from the series of packets have an expected size or sizes;

at least some of the packets from the series of packets follow an expected timing;

a particular packet has a specific payload; and a certain number of packets from the series of packets have a specific payload or specific payloads.

10. The computer-implemented method of claim 9 wherein the specific set of criteria comprises:

receiving at a first port a first packet having a first size;

receiving, within a first time period after receiving the first packet, at a second port a second packet having a second size;

receiving, within a second time period after receiving the first packet, at a third port a third packet having a third size; and receiving, within a third time period after receiving the first packet, at a fourth port a fourth packet having a fourth size.

11. The computer-implemented method of claim 10 wherein the specific set of criteria further comprises:

including a specific payload in at least one of the first, second, third, or fourth packets.

12. The computer-implemented method of claim 11 wherein the step of determining whether the series of packets of data satisfy a specific set of criteria comprises:

responsive to determining: (1) that the first packet was received at the first port and was the first size;

(2) that the second packet was received within a first time period after receiving the first packet, was received at the second port, and was the second size;

(3) that the third packet was received within the second time period after receiving the first packet, was received at the third port, and was the third size; and (4) that the fourth packet was received within the third time period after receiving the first packet, was received at the fourth port, and was the fourth size, verifying a payload of at least one of the first, second, third, and fourth packets.

13. The computer-implemented method of claim 12 wherein the step of verifying a payload of at least one of the first, second, third, and fourth packets comprises:

determining that at least one of the first, second, third, and fourth packets comprises an expected hash value in its payload.

14. A computing device comprising:

at least one processor;

a non-transitory computer-readable medium or media comprising one or more sequences of instructions which, when executed by at least one processor, causes steps to be performed comprising:

receiving a sequence of communications from a second computing device;

determining whether the sequence of communications satisfies a preset pattern;

responsive to the set of communications satisfying the preset pattern, establishing a communication session with the second computing device; and responsive to the set of communications not satisfying the preset pattern, not responding to any of the set of communications, wherein the preset pattern comprises one or more criteria comprising:

a particular packet from the series of packets was sent to a specific port;

a certain number of packets from the series of packets were sent to a specific port or specific ports;

a particular packet has a specific payload characteristic;

a certain number of packets from the series of packets have a specific payload characteristic or characteristics;

at least some of the packets from the series of packets follow an expected order;

at least some of the packets from the series of packets have an expected size or sizes;

at least some of the packets from the series of packets follow an expected timing;

a particular packet has a specific payload; and a certain number of packets from the series of packets have a specific payload or specific payloads, and wherein the sequence of communications comprises a set of packets and the step of determining whether the sequence of communications satisfies a preset pattern comprises:

verifying that each packet in the set of packets was received at a specific port and within a specific timing window according to the preset pattern; and verifying that a payload of at least one of the packet contained expected information according to the preset pattern.

15. The computing device of claim 14 wherein the step of verifying that a payload of at least one of the packet contained expected information according to the preset pattern comprises:

determining that a packet in the set of packets comprises an expected hash value in its payload.

* * * * *